(12) United States Patent
Mahadeva et al.

(10) Patent No.: US 12,340,800 B2
(45) Date of Patent: Jun. 24, 2025

(54) METHOD AND VOICE ASSISTANT DEVICE FOR MANAGING CONFIDENTIAL DATA AS A NON-VOICE INPUT

(71) Applicant: SAMSUNG ELECTRONICS CO., LTD., Suwon-si (KR)

(72) Inventors: Sathwick Mahadeva, Bangalore (IN); Indira Preethi Jain Gargatti Ajith, Bangalore (IN); Vishwanath Pethri Kamath, Bangalore (IN); Bharath Kumar Natarajan, Bangalore (IN); Madhushree Suresh Gowda, Bangalore (IN); Vijetha Kannukere Vinaya Prasad, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 777 days.

(21) Appl. No.: 17/193,828

(22) Filed: Mar. 5, 2021

(65) Prior Publication Data

US 2021/0280186 A1    Sep. 9, 2021

(30) Foreign Application Priority Data

Mar. 5, 2020    (IN)  .............................. 202041009532

(51) Int. Cl.
*G10L 15/22*    (2006.01)
*G06F 21/62*    (2013.01)
(Continued)

(52) U.S. Cl.
CPC .......... *G10L 15/22* (2013.01); *G06F 21/6281* (2013.01); *G10L 15/25* (2013.01);
(Continued)

(58) Field of Classification Search
CPC .. G06F 21/32; G06F 21/6245; G06F 21/6281; G06F 3/167; G06V 40/20;
(Continued)

(56) References Cited

U.S. PATENT DOCUMENTS 9,883,023 B2 * 1/2018 Schuster ............... H04M 1/605
10,990,954 B2   4/2021 Park et al.
(Continued)

FOREIGN PATENT DOCUMENTS

| IN | 201741009370 | 9/2018 |
| KR | 10-2016-0053391 A | 5/2016 |
| KR | 10-2016-0099397 A | 8/2016 |

OTHER PUBLICATIONS

Communication dated Jun. 23, 2021, issued by the International Searching Authority in counterpart International Application No. PCT/KR2021/002753 (PCT/ISA/220, 210, 237).

*Primary Examiner* — Angela A Armstrong
(74) *Attorney, Agent, or Firm* — Sughrue Mion, PLLC

(57) ABSTRACT

A method and a voice assistant device for managing private data are provided. The voice assistant device includes a processor configured to detect a privacy triggering event while obtaining at least one voice input from a first user in a voice input mode, switch from the voice input mode to a non-voice input mode in response to the privacy triggering event, obtain a non-voice input from the first user in the non-voice input mode, and execute an operation of the voice assistant device corresponding to the non-voice input.

8 Claims, 22 Drawing Sheets

(51) Int. Cl.
*G10L 15/25* (2013.01)
*G10L 25/78* (2013.01)

(52) U.S. Cl.
CPC ........ *G10L 25/78* (2013.01); *G10L 2015/223* (2013.01); *G10L 2015/228* (2013.01)

(58) Field of Classification Search
CPC ... G10L 15/22; G10L 15/25; G10L 2015/223; G10L 2015/228; G10L 25/78
See application file for complete search history.

(56) References Cited

U.S. PATENT DOCUMENTS

| | | | |
|---|---|---|---|
| 11,508,382 B2 * | 11/2022 | Dunjic | G06F 21/62 |
| 2016/0371504 A1 | 12/2016 | Huang et al. | |
| 2017/0083282 A1 | 3/2017 | Tsunoda | |
| 2019/0012449 A1 | 1/2019 | Cheyer | |
| 2020/0105262 A1 | 4/2020 | Abhinav et al. | |

* cited by examiner

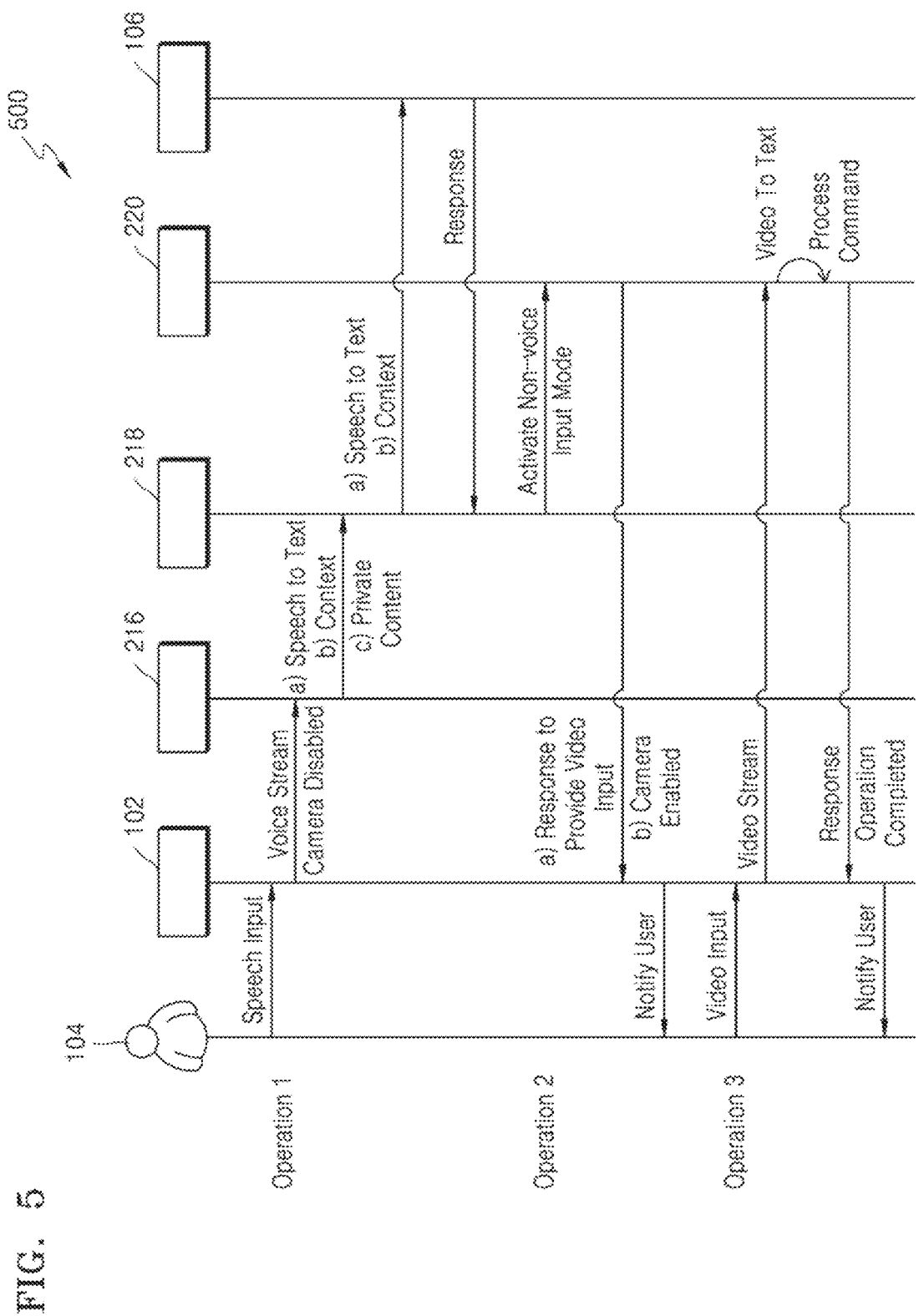

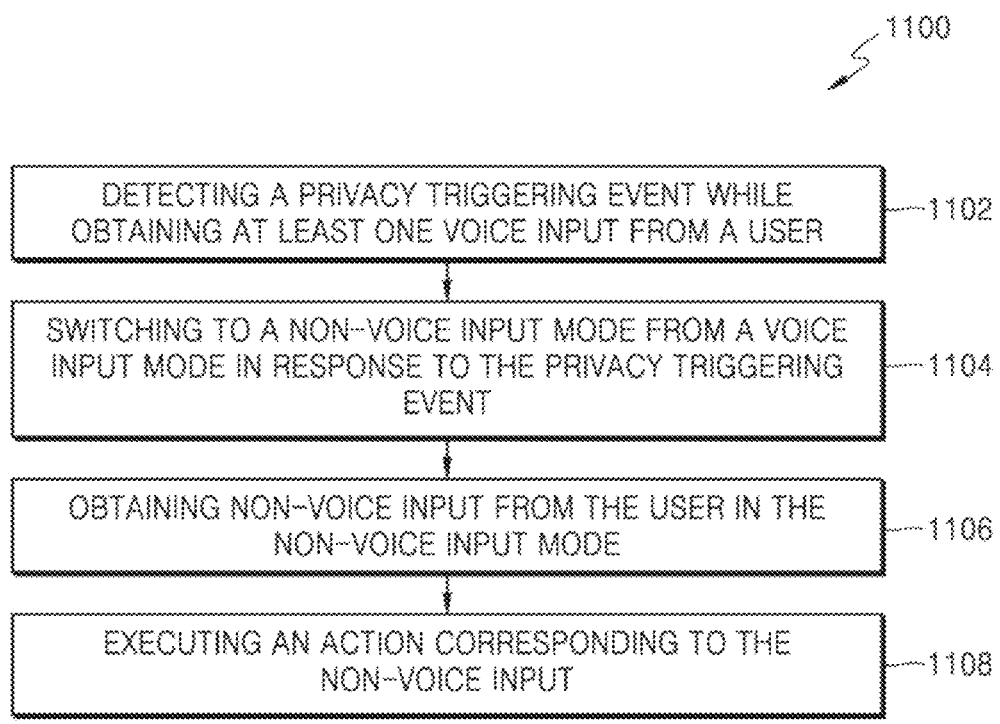

METHOD AND VOICE ASSISTANT DEVICE FOR MANAGING CONFIDENTIAL DATA AS A NON-VOICE INPUT

CROSS-REFERENCE TO RELATED APPLICATION

This application is based on and claims priority under 35 U.S.C. § 119 from Indian Patent Application number 202041009532, filed on Mar. 5, 2020, in the Indian Patent Office, the disclosure of which is incorporated by reference herein in its entirety.

BACKGROUND

1. Field

The present disclosure relates to a voice assistant device and a method of processing of a non-voice input associated with the voice assistant device.

2. Description of Related Art

With advent of technology, voice assistant devices have become very popular. Examples of voice assistant devices may include, but are not limited to, a smartphone, a smart TV, and a voice-based smart device. Such voice assistant devices respond to verbal or oral commands from users to perform actions or operations. Examples of such actions or operations may include, but are not limited to, sending message, making calls, making notes, playing music, searching for information, etc. The voice assistant devices are capable of providing instructions to other devices connected over a network to perform actions.

Typically, voice assistant devices engage users in a dialogue-based conversations using follow-up commands based on context of the conversation to perform the operations. However, in certain situations, a user might not want to provide a voice input to the voice assistant device due to the nature of the information included in the voice input and privacy concerns. In such a case, the user has to physically move to another location to provide the information or the user has to provide the information in a low voice, which might not be recognized by the voice assistant device. This leads to poor user experience. In an example situation, the user may be hesitant to provide authenticating information while performing a financial transaction using dialogue-based conversations with the voice assistant device when another person is approaching or be present in vicinity. As such, the user might move to a different location, for e.g. to a study room from a living room, to provide the authenticating information. In another example situation, the user may be hesitant to provide a list of personal items in a loud voice while placing an order for personal items online using dialogue-based conversations with the voice assistant device. In such a situation, the user may provide the list of personal items in a low voice, which might not be recognizable by the voice assistant device.

Thus, there has been a demand for a technical solution for resolving the above-mentioned issues.

In the related art, an intelligent voice assistant detects that an ambient environment is noisy based on an audio input processed by using an acoustic model and an entropy-based signal-to-noise ratio (SNR) estimation. Based on the detection of the noisy ambient environment, the intelligent voice assistant in the related art enables a camera to capture a lip movement of a user providing the audio input, and processes the captured lip movement and the audio input using the acoustic model and Kullback-Leibler (KL)-divergence estimation to recognize the audio input.

However, the solution in the related art requires reception of an audio input along with a video input, and does not provide any mechanism for handling user's privacy concerns in an ongoing dialogue-based conversation.

SUMMARY

Embodiments address at least the above problems and/or disadvantages and other disadvantages not described above. Also, the embodiments are not required to overcome the disadvantages described above, and may not overcome any of the problems described above.

In accordance with an aspect of the disclosure, a method of managing private data in a voice assistant device, may include: detecting a privacy triggering event while obtaining at least one voice input from a first user in a voice input mode; switching from the voice input mode to a non-voice input mode in response to the privacy triggering event; obtaining a non-voice input from the first user in the non-voice input mode; and executing an operation of the voice assistant device corresponding to the non-voice input.

The non-voice input mode may include at least one of a lip-reading mode, a text mode, or a gesture mode, and the non-voice input may include at least one of lip movements of the first user, a text input of the first user, or a gesture input of the first user.

The non-voice input mode may correspond to the lip-reading mode, and the non-voice input may correspond to the lip movements of the first user. The obtaining of the non-voice input may include: activating a camera to read the lip movements of the first user in the lip-reading mode.

The privacy triggering event may include a presence of a second user while the voice assistant device is communicating with the first user.

The detecting of the privacy triggering event may include: detecting the presence of the second user based on at least one of ambient noise, a voice input of the second user, or an input from an electronic device communicatively coupled with the voice assistant device.

The non-voice input may be a first non-voice input, and the method may further include: obtaining a first plurality of parameters associated with the voice assistant device and a second plurality of parameters associated with an electronic device communicatively connected to the voice assistant device; determining whether the voice assistant device and the electronic device are capable of receiving at least one non-voice input, comprising the first non-voice input, in the non-voice input mode based on the first plurality of parameters and the second plurality of parameters; and communicating the private data corresponding to the first non-voice input with the electronic device.

The first plurality of parameters may include at least one of a first location of the voice assistant device, a first indication of whether the non-voice input mode is supported by the voice assistant device, a first distance between the voice assistant device and the first user, or a second distance between the voice assistant device and a second user. The second plurality of parameters may include at least one of a second location of the electronic device, a second indication of whether the non-voice input mode is supported by the electronic device, a third distance between the electronic device and the first user, or a fourth distance between the electronic device and the second user.

The method may further include: determining whether at least one of the voice assistant device and the electronic device is capable of obtaining the at least one non-voice input based on the first plurality of parameters, the second plurality of parameters, and a presence of the second user.

The obtaining of the first non-voice input may include: notifying the first user to receive the first non-voice input via the at least one of the voice assistant device and the electronic device.

The detecting of the privacy triggering event may include: obtaining the at least one voice input from the first user in the voice input mode; extracting a context from the at least one voice input; and detecting the privacy triggering event based on the context indicating a probability of exchanging the private data with the first user.

In accordance with another aspect of the disclosure, a voice assistant device for managing private data may include: at least one memory configured to store one or more instructions; and at least one processor configured to execute the one or more instructions to: detect a privacy triggering event while obtaining at least one voice input from a first user in a voice input mode, switch from the voice input mode to a non-voice input mode in response to the privacy triggering event, obtain a non-voice input from the first user in the non-voice input mode, and execute an operation of the voice assistant device corresponding to the non-voice input.

The non-voice input mode may include at least one of a lip-reading mode, a text mode, or a gesture mode. The non-voice input may include at least one of lip movements of the first user, a text input of the first user, or a gesture input of the first user.

The non-voice input mode may correspond to the lip-reading mode, and the non-voice input may correspond to the lip movements of the first user. The voice assistant device may further include or may be connected to a camera, and the at least one processor may be further configured to execute the one or more instructions to: activate the camera to read the lip movements of the first user in the lip-reading mode.

The privacy triggering event may include a presence of a second user while the voice assistant device is communicating with the first user.

The at least one processor may be further configured to execute the one or more instructions to: detect the presence of the second user based on at least one of ambient noise, a voice input of the second user, or an input from an electronic device communicatively coupled with the voice assistant device.

The non-voice input may be a first non-voice input, and the at least one processor may be further configured to execute the one or more instructions to: obtain a first plurality of parameters associated with the voice assistant device and a second plurality of parameters associated with an electronic device communicatively connected to the voice assistant device; determine whether the voice assistant device and the electronic device are capable of receiving at least one non-voice input, comprising the first non-voice input, in the non-voice input mode based on the first plurality of parameters and the second plurality of parameters; and communicate the private data corresponding to the first non-voice input with the electronic device.

The first plurality of parameters may include at least one of a first location of the voice assistant device, a first indication of whether the non-voice input mode is supported by the voice assistant device, a first distance between the voice assistant device and the first user, or a second distance between the voice assistant device and a second user. The second plurality of parameters may include at least one of a second location of the electronic device, a third indication of whether the non-voice input mode is supported by the electronic device, a third distance between the electronic device and the first user, or a fourth distance between the electronic device and the second user.

The at least one processor may be further configured to execute the one or more instructions to: determine whether at least one of the voice assistant device and the electronic device is capable of obtaining the at least one non-voice input based on the first plurality of parameters, the second plurality of parameters, and a presence of the second user.

The at least one processor may be further configured to execute the one or more instructions to: notify the first user to receive the first non-voice input via the at least one of the voice assistant device and the electronic device.

The at least one processor may be further configured to execute the one or more instructions to: obtain the at least one voice input from the first user in the voice input mode; extract a context from the at least one voice input; and detect the privacy triggering event based on the context indicating a probability of exchanging the private data with the first user.

According to another aspect of the disclosure, a voice assistant device may include: a camera configured to capture an image of a first user; a microphone configured to receive a voice input of the first user; at least one memory configured to store one or more instructions; and at least one processor configured to execute the one or more instructions to: receive the voice input from the microphone, as a first user input of the first user; determine whether a second user input which is to be received subsequent to the first user input requires a private content, based on the first user input; based on a determination that the second user input requires the private content, activate the camera to obtain the image of the first user, as the second user input; and analyze the image of the first user to identify information contained in the second user input.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a sequence diagram of managing voice inputs and non-voice inputs with a voice assistant device according to an embodiment of the disclosure;

FIG. 11 illustrates a flow diagram of managing voice inputs and non-voice inputs with a voice assistant device, according to an embodiment of the disclosure.

DETAILED DESCRIPTION

Figure 1:
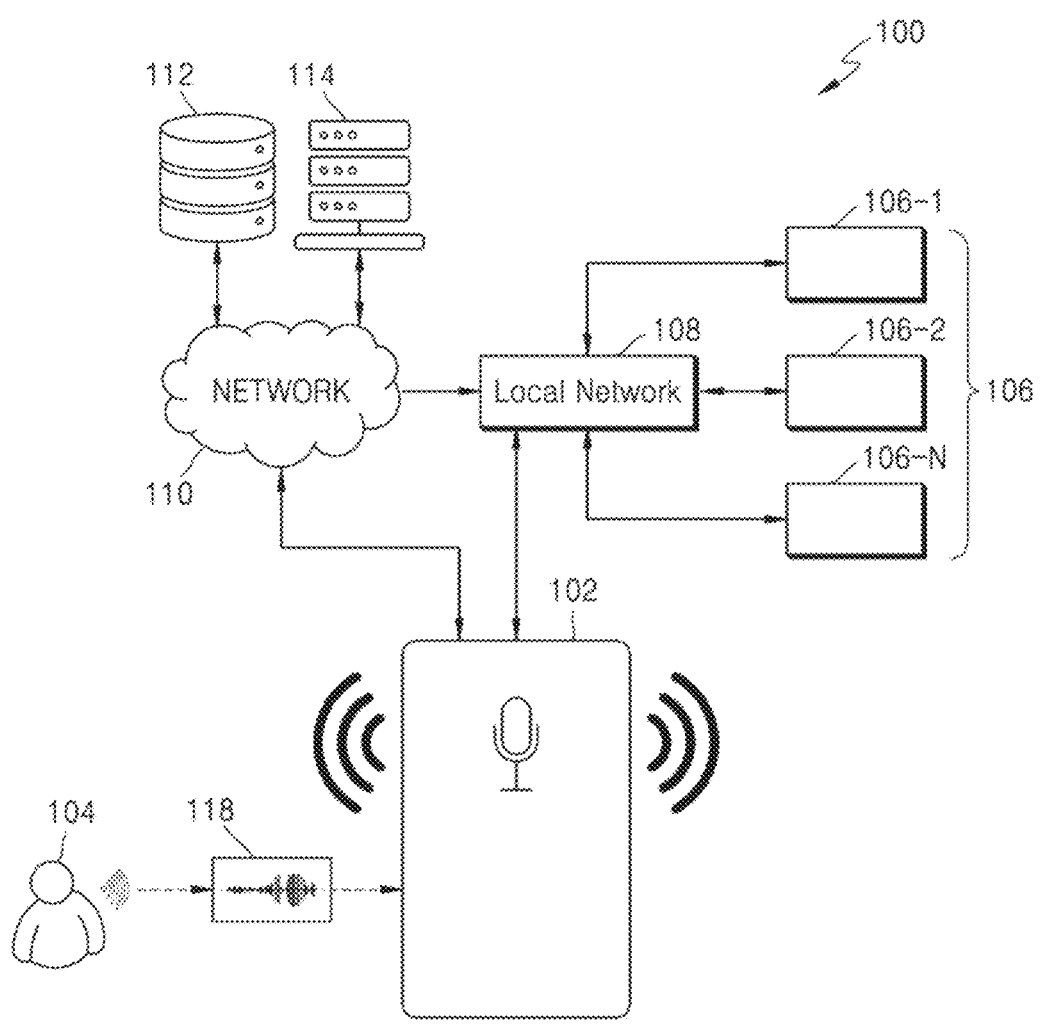
FIG. 1 illustrates an example network environment for activating a voice assistant device, according to an embodiment of the disclosure.

Various embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the embodiments can be practiced without those specifically defined matters. Also, well-known functions or constructions are not described in detail since they would obscure the description with unnecessary detail.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments of the present disclosure will be described below in detail with reference to the accompanying drawings.

FIG. 1A illustrates an example network environment 100 for activating a voice assistant device 102, according to an embodiment of the disclosure. The voice assistant device 102 may be any electronic device capable of receiving voice inputs or commands from a user 104 and initiating or performing voice-activated functions or operations (e.g., speech or voice recognition functions), and thereby may offer eyes-free and hands-free solutions to approach both existing and emerging technology. The voice assistant device 102 may be capable of performing the operations even if the user is not in line of sight of the voice assistant device 102. The voice assistant device 102 may be linked with one or more users' voice. Examples of the voice assistant device 102 may include, but are not limited to, a smartphone (for e.g., smartphone with Siri®, Cortana®, Bixby®, etc.), a smart television (TV), in-car speech recognition systems, and voice-based smart devices such as Echo® device, Alexa® device, GoogleHome® device, etc. Examples of the operations may include, but are not limited to, media reproduction including playing the media, pausing media, fast forwarding or rewinding the media, changing volume, changing screen brightness, changing light brightness, changing the mode of operation, turning on or turning off, changing into a sleep mode or waking from the sleep mode.

Referring to FIG. 1, the network environment 100 may include one or more smart devices 106 or Internet of things (IoT) devices 106 (e.g., smart devices 106-1, 106-2 . . . 106-N, hereinafter "the smart devices 106"). Examples of the smart devices 106 may include, but are not limited to, a smartphone, a desktop computer, a personal digital assistant, a notebook computer, medical devices, smart media devices such as smart televisions, smart speaker systems, wireless speakers, set-top boxes, media streaming devices, casting or mirroring devices, etc., and home appliances such as smart camera, a smart thermostat, a smart light, a smart hazard detector, a smart door lock, etc. The smart devices 106 may be communicatively coupled with or connected to the voice assistant device 102 over a network 108. In an embodiment, the local network 108 may be a local area network implemented with a network interface (e.g., a router). The smart devices 106 may transmit commands, signals or inputs to the voice assistant device 102. The smart devices 106 may also receive commands, signals or inputs from the voice assistant device 102 and may perform operation(s) based on the received commands, signals, or inputs. In an embodiment, the voice assistant device 102 may store a list of the smart devices 106 in a storage. Examples of the operations may include, but are not limited to, media reproduction including playing the media, pausing media, fast forwarding or rewinding the media, changing volume, changing screen brightness, changing light brightness, changing the mode of operation, turning on or turning off, changing into a sleep mode or waking from the sleep mode. The voice assistant device 102 and the smart devices 106 may be located in one or more locations (e.g., all in a room or space of a structure, spread out throughout multiple spaces within the structure or throughout multiple structures (e.g., one in a house of a user, one in the user's office and one in the user's car).

The voice assistant device 102 and the smart devices 106 may be further communicatively coupled, through a communication network 110 to one or more of content server(s) 112 and host server(s) 114 to exchange information. Examples of the network 110 include, but are not limited to, a cloud-based network, a Wi-Fi® network, a WiMAX® network, and/or a Wireless Local Area Network (WLAN). In an example, the communication network 110 may include the local network 108. The content server(s) 112 may be a remote content source from which content is streamed or otherwise obtained in accordance with voice command provided by the user. The host server(s) 114 may host applications that provide various services to the users. Examples of the applications include, but are not limited to, social networking application, messaging application, chat application, video calling application, voice calling application, navigation application, e-commerce application, banking application, travel application, etc.

In accordance with some example embodiments, the voice assistant device 102 may operate in at least two input modes to receive inputs from the user 104 for performing various operations. The input mode may include a voice input mode and a non-voice input mode. The voice input mode may enable the voice assistant device 102 to receive and recognize voice inputs of the user 104 (hereinafter interchangeably referred to as "the first user 104"). In an embodiment, the non-voice input mode may enable the voice assistant device 10 to receive and recognize non-voice inputs including lip shapes of the user in a lip-reading mode, text inputs of the user in a text mode, and gesture inputs of the user in a gesture mode. In an embodiment, the non-voice input mode is indicative of receiving input in any format other than voice, such as an image, a text, and a gesture from the user 104. In an embodiment, in the lip-reading mode, the non-voice input is provided through a video containing lip movements of the user 104. In an embodiment, in the text mode, the non-voice input is provided through keypads or touchpads of the voice assistant device 102. In an embodiment, in the gesture mode, the non-voice input is provided through video containing face gestures or body gestures of the user 104 or through touch inputs on a touch-sensitive display of the voice assistant device 102. As such, the voice assistant device 102 may, in response to any privacy triggering event, activate various non-voice input mode on the voice assistant device 102. The voice assistant device 102 may receive one or more voice commands 118 indicative of performing the operation when the voice input mode is activated during an ongoing interaction. The voice assistant device may include a processor 302 which will be illustrated in detail referring to FIG. 3. The processor 302 of the voice assistant device 102 may derive a context of the ongoing or current interaction with the first user 104 (e.g., a "dialogue-based conversation" between the first user 104 and the voice assistant device 102). The processor 302 of the voice assistant device 102 may determine a probability of exchanging private data (for e.g., personal information, user authenticating information, etc.) between the first user 104 and the voice-assistant device 102 based on the derived context.

Figure 2:
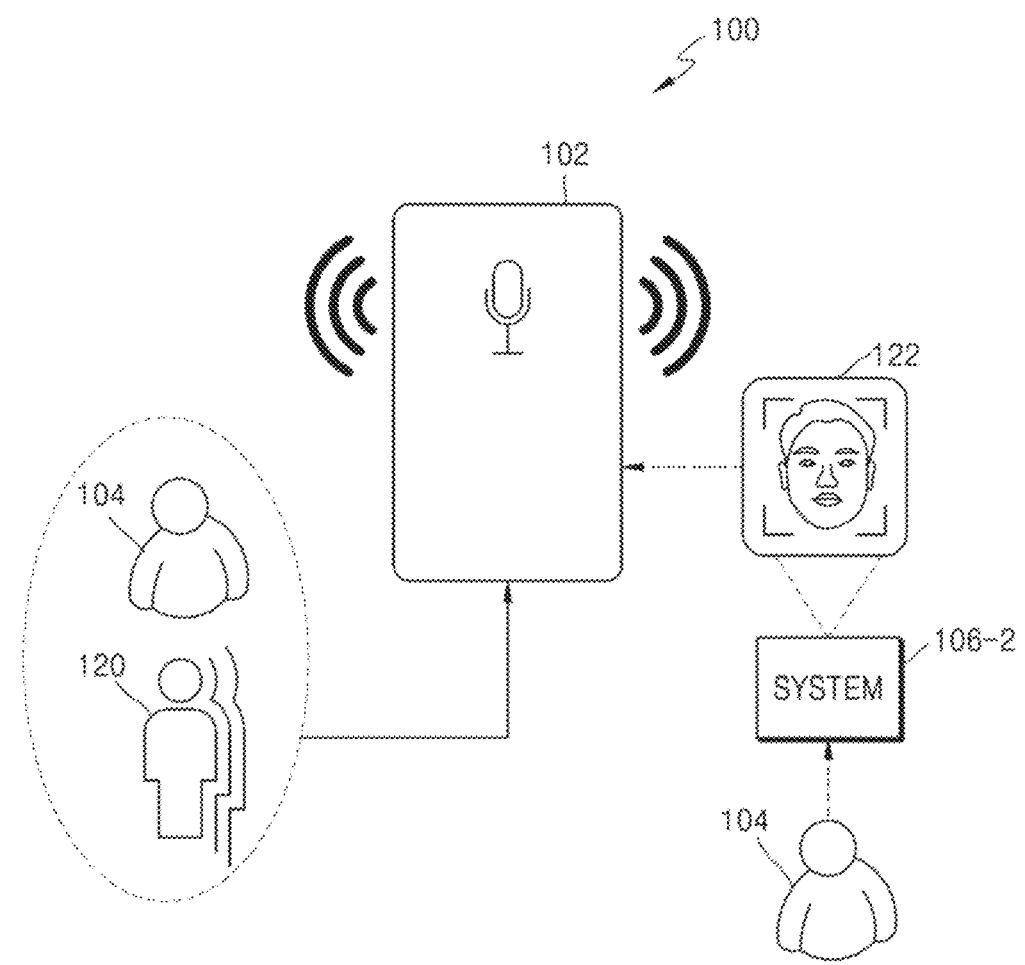
FIG. 2 illustrates an example network environment for activating a voice assistant device, according to an embodiment of the disclosure.

FIG. 2 illustrates an example network environment for activating a voice assistant device, according to an embodiment of the disclosure.

Referring to FIG. 2, the processor 302 of the voice assistant device 102 may detect a presence of at least one second user 120 in proximity to one of the first user 104 (represented by dashed circle) and the voice assistant device 102. In an embodiment, the detection of the probability of exchanging the private data, the presence of at least one second user 120, or combination thereof may become a privacy triggering event. In response to the privacy triggering event, the processor 302 of the voice assistant device 102 may activate a non-voice input mode for exchanging the private data when the presence of the at least one second user is detected. In an embodiment, the processor 302 may activate the non-voice input mode to receive non-voice input of a lip shape in a lip-reading mode. In an embodiment, the processor may control a camera 316 to capture lip movements of the first user 104 which provides the private data without any audio or voice input from the user.

Figure 3A:
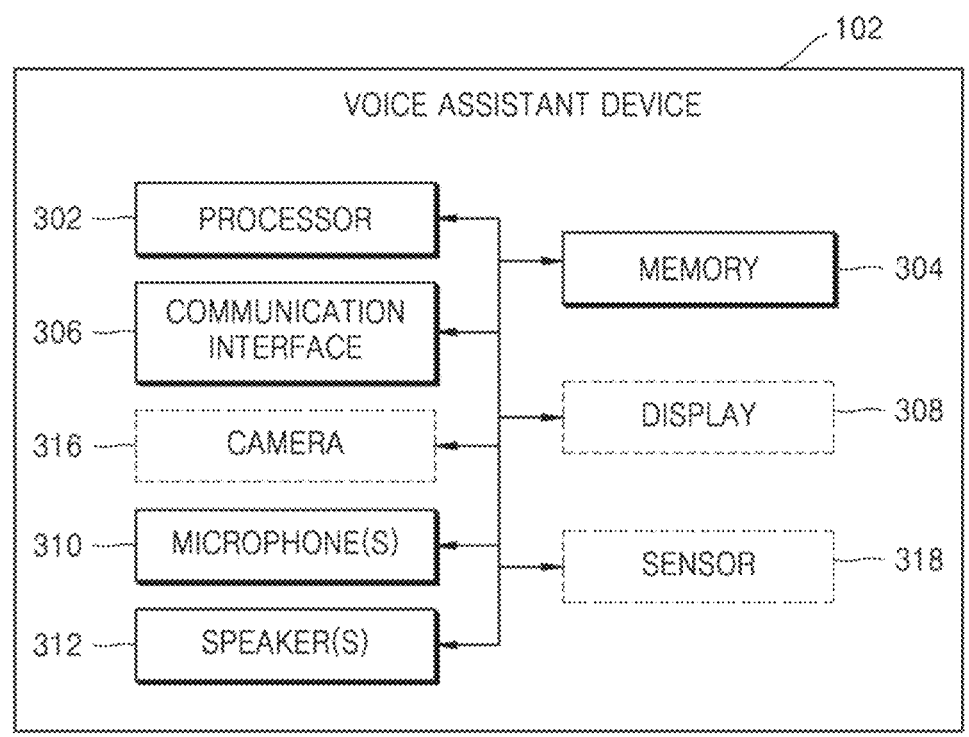
FIG. 3A illustrates a block diagram of a voice assistant device according to an embodiment of the disclosure.

FIG. 3A illustrates a block diagram of a voice assistant device according to an embodiment of the disclosure.

For the sake of brevity, features of the present disclosure explained in detail with reference to FIG. 1 and FIG. 2 are not additionally explained with reference to FIG. 3A and therefore, the description of FIG. 3A should be read in conjunction with the description of FIG. 1 and FIG. 2 for better understanding.

The voice assistant device 102 may include at least one processor 302 (also referred to herein as "the processor 302"), a memory 304, a communication interface(s) 306, display(s) 308, a microphones(s) 310, speaker(s) 312, a camera(s) 316, and/or a sensor(s) 318. The processor 302, the memory 304, the communication interface(s) 306, the display(s) 308, the microphones(s) 310, the speaker(s) 312, the camera 316, the sensor(s) 318 may be communicatively coupled with each other via a bus (illustrated using directional arrows). The voice assistant device 102 may also include one or more input devices such as a stylus, a number pad, a keyboard, a cursor control device, such as a mouse, and/or a joystick, etc., and/or any other device operative to interact with the voice assistant device 102.

The processor 302 may be a single hardware processing unit or a number of hardware processing units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may fetch and/or execute computer-readable instructions and/or data (e.g., the data 322) stored in the memory 304.

The memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The communication interface(s) 306 may enable (e.g., facilitate) communication between the voice assistant device 102 and a user and/or the smart devices 106. The display 308 may display various types of information (for example, media contents, multimedia data, text data, etc.) to the user 104 of the voice assistant device 102. The display 308 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display. The display 308 can be a touch-enabled display or a non-touch display. The voice assistant device 102 may or may not include the display 308 (therefore illustrated with dashed lines). In an example, the voice assistant device 102 may be the smartphone with voice assistance capabilities and therefore may include the display 308. In an example, the voice assistant device 102 may be the voice-controlled intelligent assistant device with speakers and therefore may be communicatively coupled with the display 308. The microphones(s) 310 and the speaker(s) 312 may be integrated with the voice assistant device 102.

The camera 316 may be integral or external to the voice assistant device 102 (therefore illustrated with dashed lines). Examples of the camera 312 include, but are not limited to, a three-dimensional (3D) camera, a 360-degree camera, a stereoscopic camera, a depth camera, etc. In an example, the voice assistant device 102 may be a smartphone with voice assistance capabilities and therefore may include the camera 316. In an example, the voice assistant device 102 may be a voice-controlled intelligent assistant device with speakers and therefore the camera 316 may be communicatively coupled with the voice assistant device 102.

The sensor(s) 318 may be integral or external to the voice assistant device 102 (therefore illustrated with dashed lines). Examples of the sensor(s) 318 include, but are not limited to, an eye-tracking sensor, a facial expression sensor, an accelerometer, a gyroscope, a location sensor, a gesture sensor, a grip sensor, a biometric sensor, an audio module, location/position detection sensor and a touch-sensitive sensor.

Figure 3B:
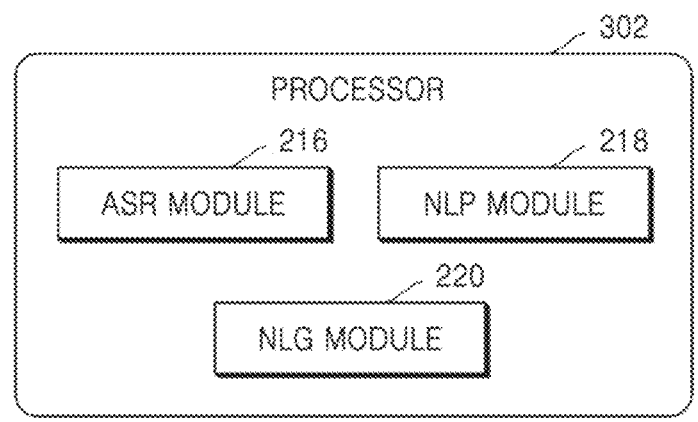
FIG. 3B illustrates a block diagram of a processor included in the voice assistant device, according to an embodiment of the disclosure.

FIG. 3B illustrates a block diagram of a processor included in the voice assistant device, according to an embodiment of the disclosure.

In an embodiment, the processor 302 of the voice assistant device 102 may include an automatic speech recognition (ASR) module 216, a national language processing (NLP) module 218, and a natural language generation (NLG) module 220. The details of each of the modules may be further explained referring to FIG. 4 of the disclosure.

Figure 4:
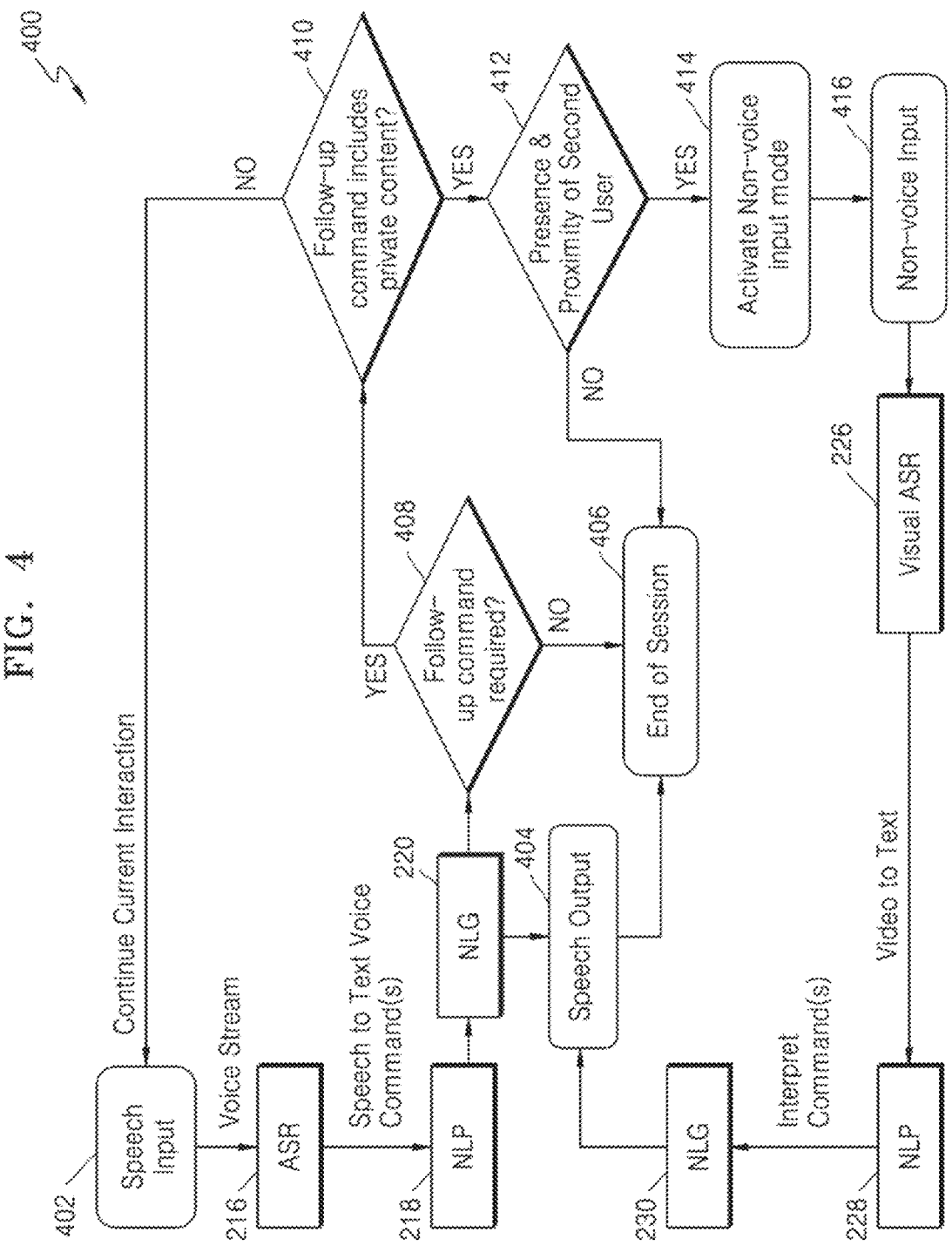
FIG. 4 illustrates a flow diagram of managing voice inputs and non-voice inputs with a voice assistant device according to an embodiment of the disclosure.

FIG. 4 illustrates a flow chart for a method of managing voice inputs and non-voice inputs with a voice assistant device according to an embodiment of the disclosure.

Referring to FIG. 4, a flow chart 400 shows a method of performing the input mode activation on the voice assistant device 102. The first user 104 may provide one or more voice commands indicative of performing an operation to the voice assistant device 102 when a voice input mode is activated on the voice assistant device 102. In the voice input mode, a non-voice input mode enabling non-voice inputs may be deactivated. The microphone 310 may receive a speech input including voice commands in operation 402. The speech input may be used interchangeably with the voice input. The processor 302 may derive a context of the ongoing or the current interaction (e.g., a conversation) with the first user 104 based on the received voice commands. To this end, the ASR module 216 as a part of the processor 302 may convert the voice stream and/or audio signals included in the speech input into a textual content. The ASR module 216 may convert the voice stream into textual content using automatic speech recognition techniques. In an embodiment, the NLP module 218 as a part of the processor 302 may analyze the textual content and user-related content to derive the context in the speech input. The user-related content may indicate personal information about the first user 104 such as email address, calendar events, travel information, browsing patterns, conversation pattern, etc. The NLP module 218 may analyze the textual content using techniques of natural language processing. The NLP module 218 may further analyze the textual content and convert the textual content to text-to-voice command(s). The voice commands from the first user 104 may be a part of dialogue or conversation between the first user 104 and the voice assistant device 102. In an embodiment, the NLG module 220 as a part of the processor 302 may generate a speech output based on the text-to-voice command(s) in operation 404. The speech output may be reproduction of the content and/or the context, alerting and initiating the operation based on the content and/or the context, and notifying a result or a completion of the operation. The conversation or the current interaction session between the first user 104 and the voice assistant device 102 ceases or ends upon the generation of the speech output in operation 406.

In an embodiment, upon determination of the context, the processor 302 may determines a probability of exchanging private data between the first user 104 and the voice assistant device 102 based on the derived context. To this end, the NLP module 218 may determine a requirement of at least one follow-up voice command to the previous voice command in operation 408 and determine if the at least one follow-up command is likely to include private data (e.g., confidential data) which should not be disclosed to a third person (other than the first user 104) to complete the operation based on the derived context in operation 410. The private data may be personal information, user authenticating information, private information, etc. A user intent may also be determined based on the derived context of the previous interactions and may indicate that the first user 104 wants to provide private data to complete the operation. The NLP module 218 may determine the user intent based on at least one of the voice commands and/or at least one predefined keyword extracted in the voice commands and the derived context. The keywords may be predefined by the first user 104 and be stored in the memory 204. The NLP module 218 may determine the requirement of the at least one follow-up voice command including private content. If the follow-up voice command is determined to be not required in operation 408, the current interaction session ends in operation 406. If the follow-up voice command is determined to be required in operation 408 and the follow-up command does not need to include the private data in operation 410, then the current interaction session continues from operation 402 by receiving voice commands. If the follow-up command needs to include private data or confidential data, the processor 302 may activate the non-voice input mode in operation 414.

In an embodiment, upon determining the requirement of the follow-up command including private data in operation 410, the processor 302 may detect a presence of the at least one second user 120 (hereinafter referred to as "the second user 120" for the sake of brevity) in proximity to one of the first user 104 and the voice assistant device 102 in operation 412. Depending on the embodiments, operation 412 may be added between operation 410 and operation 414, or may be omitted so that the method proceeds to operation 414 directly from operation 412. In operation 412, the processor 302 may, with sensor(s) 318 or without sensor(s) 318, detect the presence of the second user 120 and/or the proximity of the second user 120 based on one or more of ambient noise, a voice input from the second user 120 and an input from at least one smart device 106. In an embodiment, a camera connected to or implemented in the voice assistant device 102 may capture a presence of another person (e.g., the second user 120) in proximity to the first user 104. In an example, the voice assistant device 102 may detect a presence of another person in proximity to the voice assistant device 102 upon detecting voice of another user. For example, the voice assistant device 102 may determine that another person (e.g., the second user 120) is present or in proximity to the voice assistant device when a distance from the other person (e.g., the second user 12) to the voice assistance device 102 or the first user 104 is less than a preset distance. If the presence of the second user 120 is not detected in operation 412, the current interaction session continues. On the other hand, if the presence and the proximity of the second user 120 is detected in operation 412, and the follow-up command is determined to include private data in operation 410, the process proceeds to operation 414. The order of operations 410 and 412 may be changed so that operation 410 occurs before operation 412, operation 412 occurs before operation 410, or operations 410 and 412 are performed in parallel.

In an embodiment, based on the detected presence of the second user 120 in proximity to one of the first user 104 and the voice assistant device 102 in operation 412, and the determination of the at least one follow-up command containing private data in operation 410, the processor 302 may activate the non-voice input mode on the voice assistant device 102 to receive the private data from the first user 104, in operation 416. To this end, the processor 302 may obtain a first plurality of parameters pertaining to the voice assistant device 102 and a second plurality of parameters pertaining to at least one smart device 106 connected to the voice assistant device 102. The first plurality of parameters pertaining to the voice assistant device 102 may include a location of the voice assistant device 102, an indication whether the non-voice input mode is supported by the voice assistant device 102 (for e.g., availability of touch-based display, camera), and a distance-proximity-between the voice assistant device 102 and the first user 104, and a distance-proximity-between the voice assistant device 102 and the second user 120. To this end, the processor 302 may obtain the first plurality of parameters from any or all of the display 308, the camera 316, data stored in the memory 304 and the sensor(s) 318. The second plurality of parameters pertaining to the at least one smart device 106 includes a location of the at least one smart device 106, status of the at least one smart device 106 (for e.g., whether the device is idle, wake, switched-off), current activity on the at least one smart device 106 (for e.g., whether the device is playing any media), an indication whether the non-voice input mode is supported by the at least one smart device 106 (for e.g., availability of touch-based display, camera), a distance-proximity between the at least one smart device 106 and the first user 104 and a distance-proximity-between the at least one smart device 106 and the second user 120. To this end, the processor 302 may obtain the second plurality of parameters from any or all of the components of the at least one smart device 106 such as a processor, a display, data included in a memory of the smart device 106, a camera, and a sensor(s) of the smart device 106.

The processor 302 may then determine whether at least one of the voice assistant device 102 and the at least one smart device 106 is capable of receiving a non-voice input based on at least one of the first plurality of parameters, the second plurality of parameters, and the determined or detected presence and proximity of the second user 120. In an embodiment, the voice assistant device 102 is a smartphone having a touch-sensitive display and the smart device 106 is a voice-controlled intelligent assistant device with speakers. As such, the processor 302 may determine the touch-sensitive display of the smartphone is available and capable of receiving text inputs to provide the private data. In another example, the voice assistant device 102 is a voice-controlled intelligent assistant device with speakers and the smart device 106 is equipped with a smart camera. The processor 302 may determine that the smart camera is available and capable of receiving a lip shape input in a lip-reading mode to obtain the private data. In an embodiment, the voice assistant device 102 may capture the lip shape with the camera 316 to obtain the private data. In another example, the voice assistant device 102 is a smartphone with a touch-sensitive display and a camera and the smart device 106 is equipped with a smart camera. The smart device 106 is located in proximity to the first user 104. Then, the processor 302 may determine that the smart device 106 with the smart camera is available and capable of receiving lip-shape inputs in the lip-reading mode to obtain the private data. In another example, the voice assistant device 102 is a smartphone with a touch-sensitive display and/or a camera and the smart device 106 is a smart TV equipped with/without a camera. The smart device 106 is located in proximity to the first user 104 but is currently playing or streaming media programs. Then, the processor 302 may determine that the smartphone is available and capable of receiving gesture inputs in a gesture mode to obtain the private data.

The processor 302 may activate the non-voice input mode on the voice assistant device 102 in operation 414 based on the determination that the following-up command need to contain the private-confidential-data. The processor 302 may control at least one of the voice assistant device 102 and the at least one smart device 106 to receive the input during the current interaction. To this end, the processor 302 may provide instructions and information such as session information, type of input required, etc., to the voice assistant device 102 and/or the smart device 106. Based on the instructions and information, one or more applications on the voice assistant device 102 and/or the smart device 106 may be ready to receive non-voice inputs with any of the processor 302, the display 308, the camera 316 and sensor(s) 318.

In an embodiment, the processor 302 may notify the first user 104 to provide the private data via at least one of the voice assistant device 102 and the at least one smart device 106. The processor 302 may notify the first user 104 by way of an audio output, a notification or an alert message or a predetermined visual output—e.g. blinking with particular color on the display 308. In an example, the NLG module 230 may then generate a natural language audio output of "secret mode" or "private mode". In an example, the voice assistant device 102 is a smartphone with the camera 316 and a touch-sensitive display and the camera 316 is activated to capture lip movements of the first user 104. The processor 302 may generate a floating message prompting the first user 104 to provide a follow-up command to previous commands in a privacy mode or a non-voice input mode. In an example, the smart device 106 may be equipped with a smart camera. The camera 316 is activated to capture lip movements of the first user 104. The processor 302 may generate an audio notification or a speech output prompting the first user 104 to provide follow-up commands in the privacy mode or the non-voice input mode through the smart camera included in the smart device 106. Thus, the follow-up command may be generated based on the lip-movements or lip-shapes in a video format or based on the text inputs in a text format.

Upon notifying the first user 104, the voice assistant device 102 may receive at least one follow-up command from the first user 104 directly or via the smart device 106 in operation 416 when the non-voice input mode is activated on the voice assistant device 102. In an example, the follow-up command may be obtained by capturing gestures of the first user or hand movements of the first user 104. In an example, the follow-up command may be obtained by receiving text inputs from the first user 104.

The visual automatic speech recognition (VASR) module 226 as part of the processor 302 may convert the follow-up commands in the visual format into textual content in a text format using visual speech recognition techniques, image analysis, etc. The NLP module 228 may then analyze the converted textual content to determine the content of the private data. The NLP module 228 may analyze the textual content using techniques such as natural language processing. In an embodiment, the NLP module 228 may prevent the voice assistant device 102 from audio and/or video reproduction of the private data. The NLG module 230 may then notify the user when the operation is completed based on the private data. The NLG module 230 may notify the first user 104 by way of audio output, notification, alert message, or an visual output. Upon completion of the operation, the processor 302 may activate the voice input mode and deactivate the non-voice input mode. The voice input mode may be activated by a non-privacy triggering event including, but are not limited to, a predetermined lip-movements, predetermined lip-shapes, predetermined gestures, predetermined text inputs and/or determination that the second user 120 is not in vicinity of the first user or the voice assistant device 102. The voice assistant device 102 may determine that the second user 120 is not in vicinity of the first user or the voice assistant device 102 if the voice of the second user is not detected for predetermined duration of time and/or the second user is not captured by the camera 316 for predetermined duration of time.

FIG. 5 illustrates a sequence diagram of managing voice inputs and non-voice inputs with a voice assistant device according to an embodiment of the disclosure.

Referring to FIG. 5, the first user 104 may provide a speech input to a voice assistant device 102 in operation 1. The ASR module 216 may convert the speech to text, the NLP module 218 may derive a context from the converted texts, and the processor 302 may determine a probability of exchanging private data, in other words, may determine whether the follow-up voice command includes confidential data or private data. The processor 302 may detect, with sensor(s) 318 or without sensor(s) 318, a presence of the second user 120 in proximity to one of the first user 104 and the voice assistant device 102. The processor 302 may request the connected smart device 106 to provide corresponding input. The smart device 106 may provide the response indicating the presence and proximity of the second user 120.

In operation 2, the processor 302 may activate the non-voice input mode based on the response. The NLG module 220 may provide a response to the voice assistant device 102 to obtain the follow-up command as a non-voice input and to notify the first user 104 to provide the non-voice input of lip movements, gestures or text inputs. The processor 302 may then enable or activate the camera 316 of the voice assistant device 102 to obtain the non-voice input.

In operation 3, the first user 104 may provide non-voice inputs such as lip movements, gestures or text inputs to the voice assistant device 102 in the non-voice input mode. The processor 302 may convert the video to text. The processor 302 may provide, to the voice assistant device 102, a response indicating a completion of the operation and the voice assistant device 102 may notify the first user 104 about the completion.

Figure 6A:
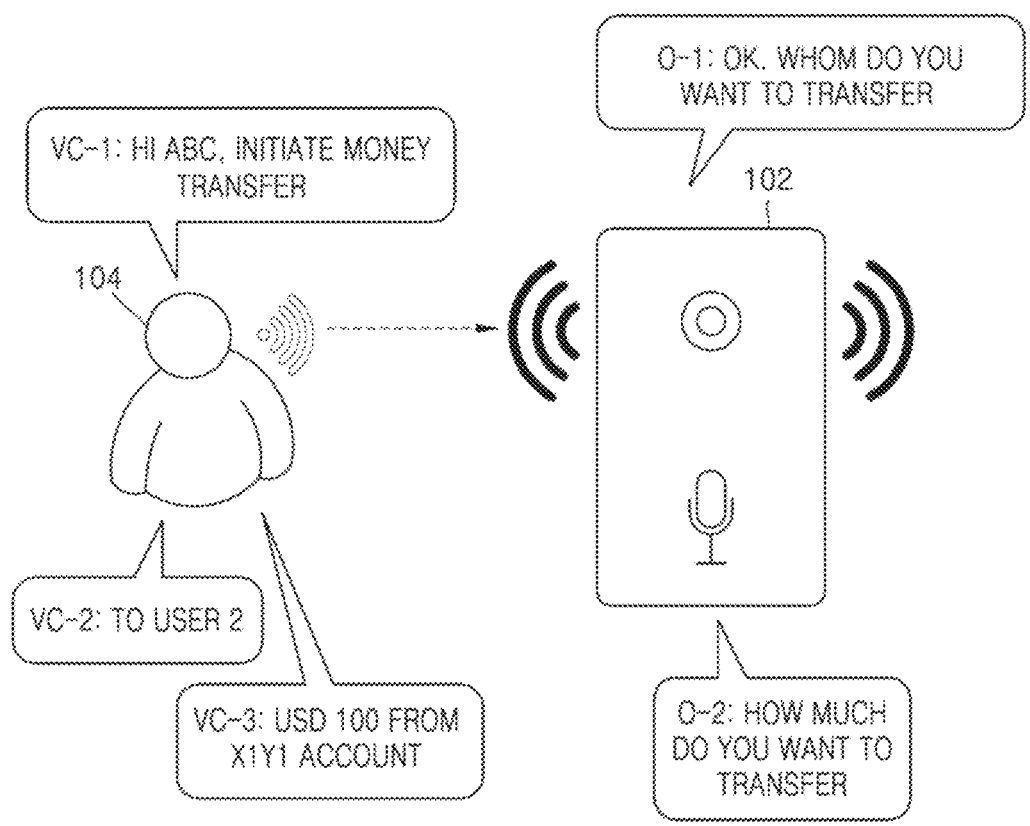
FIGS. 6A, 6B and 6C illustrate example scenarios of managing voice inputs and non-voice inputs with a voice assistant device, according to an embodiment of the disclosure.
Figure 6B:
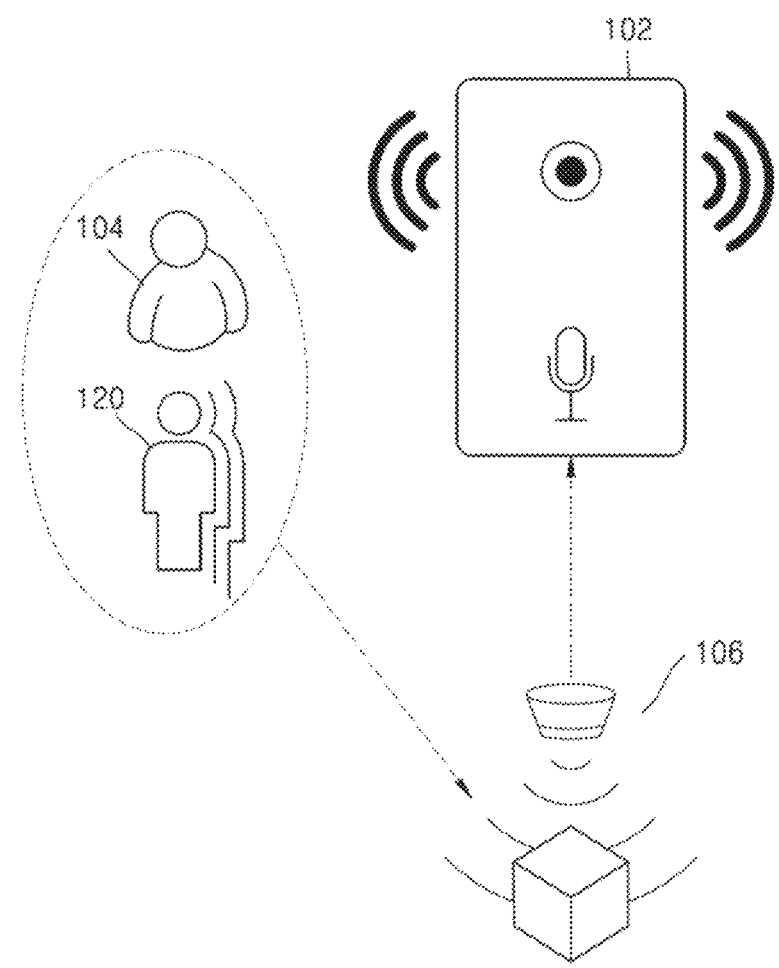
Figure 6C:
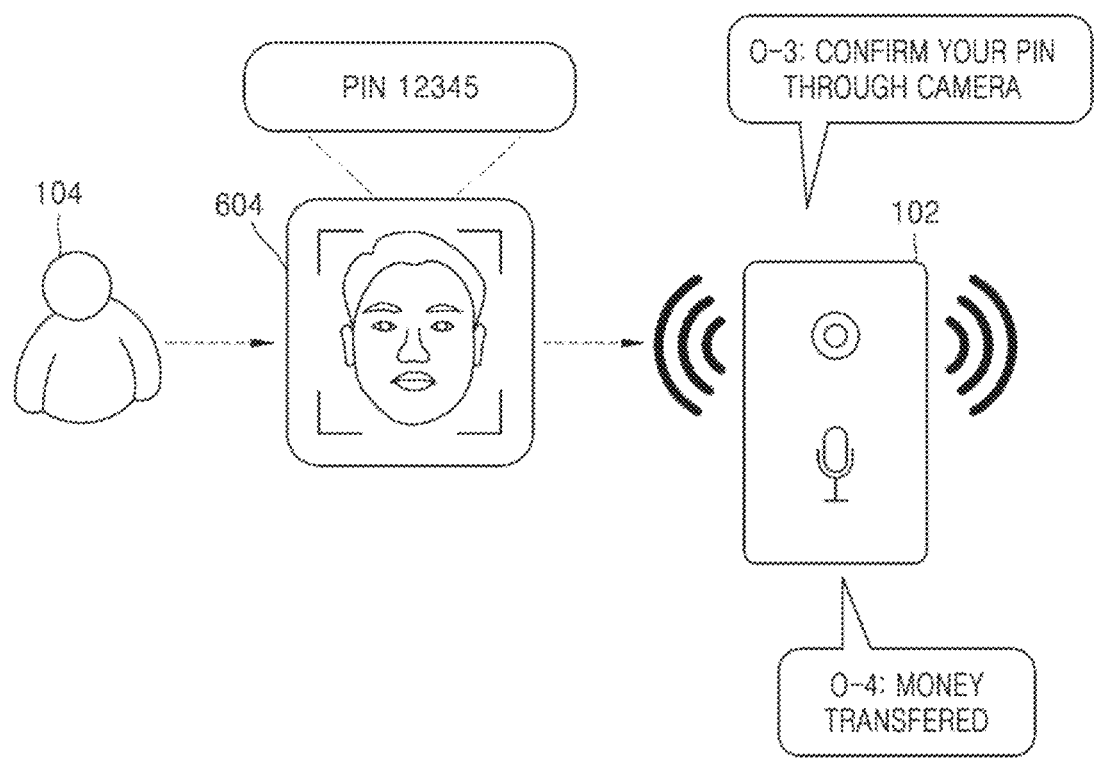

FIGS. 6A, 6B and 6C illustrate example scenarios of managing voice inputs and non-voice inputs with a voice assistant device, according to an embodiment of the disclosure.

In the example, the voice assistant device 102 may be a smartphone with voice assistance capabilities. The smartphone is equipped with the camera 316. Referring to FIG. 6A, the camera 316 may be deactivated (represented by no pattern in circles) while the voice input mode is activated on the smartphone 102. The first user 104 may engage in a dialogue-based conversation with the voice assistant device 102 to perform certain operation, i.e., transferring money. Accordingly, the first user 104 may provide a voice command VC-1 to initiate the operation by "Hi ABC, initiate money transfer". In response to the voice command VC-1, the processor 302 may analyze the voice command and generate an output O-1 to seek further information from the first user 104 by "Ok, whom do you want to transfer?" In response, the first user 104 may provide another voice command VC-2 indicating the recipient name of "To User 2". In response to the voice command VC-2, the processor 302 may analyze the voice command VC-2 and generate output O-2 to seek further information from the first user 104 by "how much money do you want to transfer?". In response, the first user 104 may provide another voice command VC-3 indicating the amount and account information as "USD 100 from X1Y1 account". The processor 302 may derive or extract the context of "authentication of financial transaction" and the user's intent as "to provide authentication information in privacy" based on the voice commands. In an embodiment, texts of "money transfer", "sending money", "bank account" and/or "account" may be stored as predetermined context indicating a request of follow-up commands in a private mode or a non-voice input mode in the memory 304. The processor 302 may determine the probability of exchanging private data or that the follow-up command may include private or confidential content, i.e., authentication information or a personal identification number (PIN), based on the extracted context and the predetermined context.

Referring to FIG. 6B, a second user 120 approaches the first user 104. The processor 302 may determine a presence of the second user 120 based on audio inputs of the second user's voice from the smart device 106 or proximity sensors. The presence of the second user 120 may become a privacy triggering event. In response to the privacy triggering event, the processor 302 may activate a non-voice input mode and control the camera 316 to obtain non-voice inputs of the follow-up command.

Referring to FIG. 6C, the voice assistant device 102 may prompt the first user 104 to provide the follow-up command in a privacy mode or non-voice input mode and generate an output O-3 of "confirm your PIN in privacy mode through the camera 316". The privacy mode may be indicative of providing PIN by moving lips without any audio, i.e., in a lip-reading mode. The camera 316 may then capture the video 604 of lip movements of the first user 104. The processor 302 may then analyze the video 604 to determine the non-voice input of "PIN 12345" and complete the transaction using the PIN. The processor 302 may generate output O-4 to confirm the completion of the transaction to the first user 104 as outputting "money transferred".

Figure 7A:
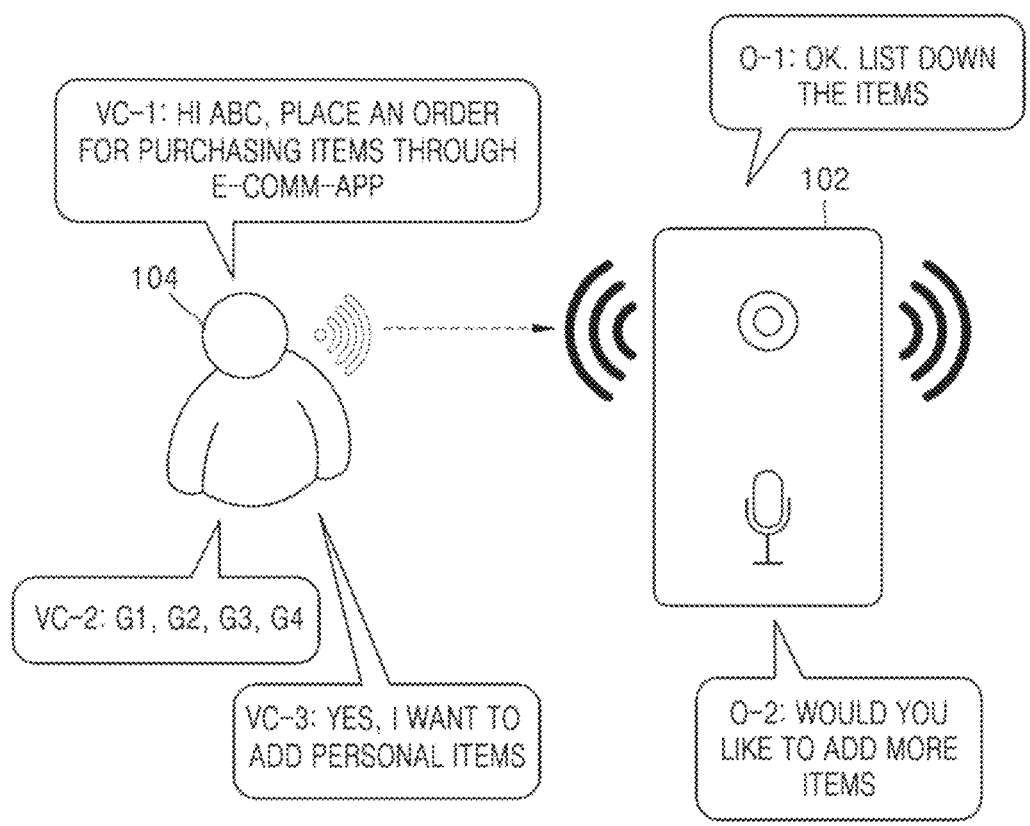
FIGS. 7A, 7B and 7C illustrate example scenarios of managing voice inputs and non-voice inputs with a voice assistant device, according to an embodiment of the disclosure.
Figure 7B:
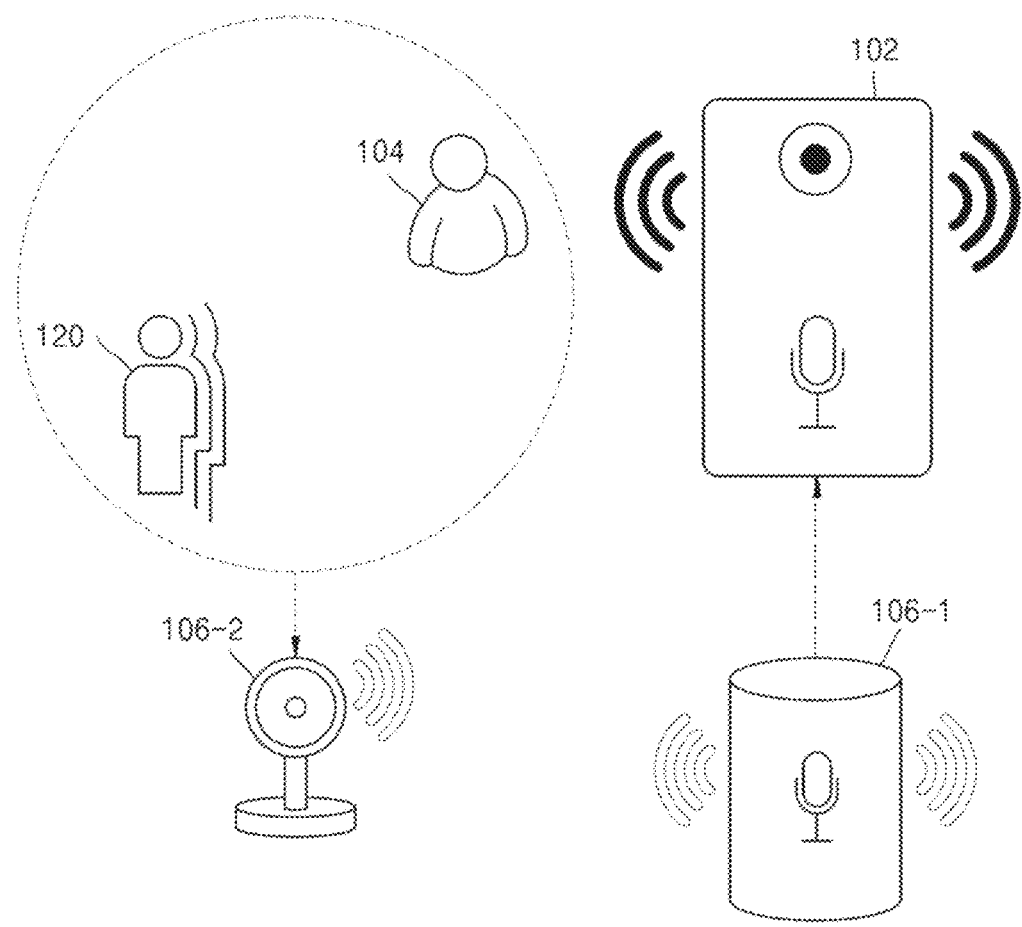
Figure 7C:
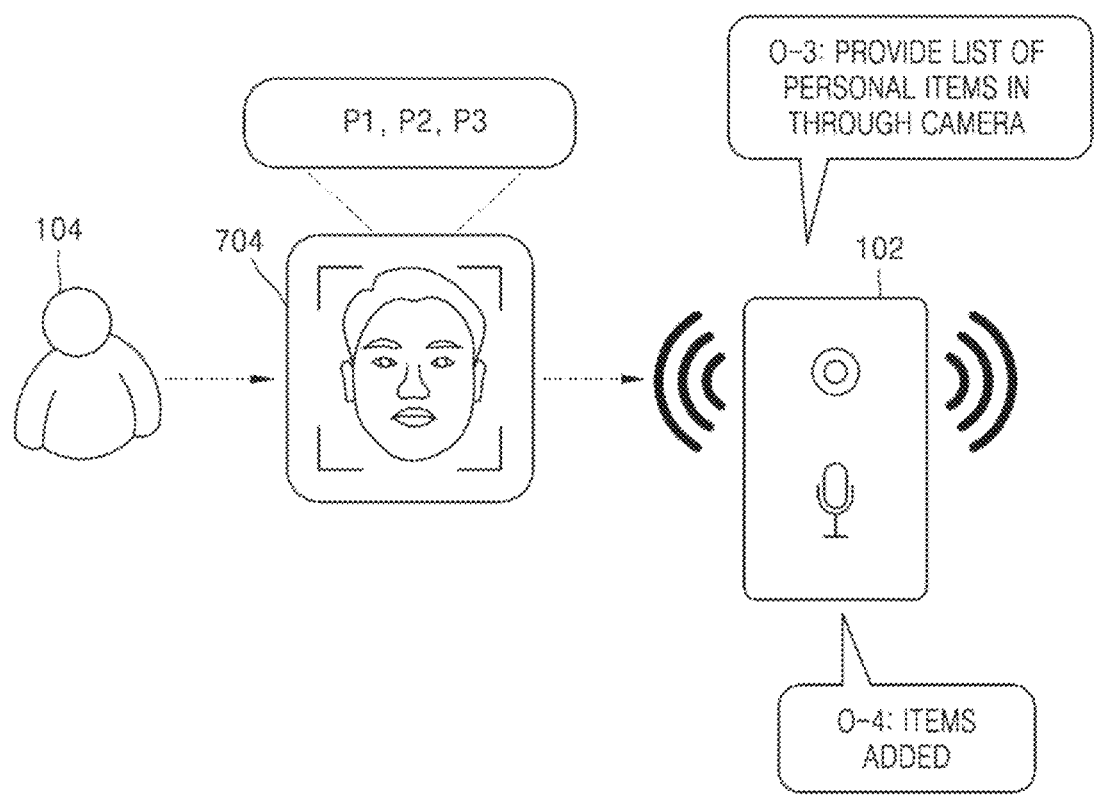

FIGS. 7A, 7B and 7C illustrate example scenarios of managing voice inputs and non-voice inputs with a voice assistant device, according to an embodiment of the disclosure.

In the example, the voice assistant device 102 is a smartphone with voice assistance capabilities. The voice assistant device 102 includes the camera 316. Referring to FIG. 7A, the camera 316 is deactivated (represented by no pattern in circles) while the voice input mode is activated on the voice assistant device 102. The first user 104 may engage in a dialogue-based conversation with the voice assistant device 102 to perform certain operations, i.e., ordering items on e-commerce application. Accordingly, the first user 104 may provide a voice command VC-1 to initiate the operation by stating "Hi ABC, place an order for purchasing items through E-comm-App". In response to the voice command VC-1, the processor 302 may analyze the voice command VC-1 and generate an output O-1 to obtain further information from the first user 104 by responding "Ok. List down the items". In response, the first user 104 may provide another voice command VC-2 indicating the items as "G1, G2, G3, and G4". In response to the voice command VC-2, the processor 302 may analyze the voice command and generate an output O-2 to obtain further information from the first user 104 by stating "would you like to add more items". In response, the first user 104 may provide another voice command VC-3 indicating the personal items as "Yes, I want to add personal items". The processor 302 may extract the context as "ordering personal items" and the user intent as "to order privately" based on the predefined keyword of "personal" in the voice command VC-3. The processor 302 may determine the probability of exchanging private data or that the follow-up command may include private content, i.e., personal items, based on the context.

Referring to FIG. 7B, the voice assistant device 102 may be connected to a voice intelligent device or the smart device 106-1. The smart device 106-1 may be connected to a smart camera which is a smart device 106-2. The second user 120 arrives in a location close to the first user 104 and becomes in proximity to the first user 104. The voice assistant device 102 may determine that the second user 120 is located close or in proximity to the first user 104 when a distance between the first user 104 and the second user 120 is less than a preset distance. As such, the smart camera 106-2 may provide information about the detection of the second user 120 to the smart device 106-1. The smart device 106-1 may then provide the information about the presence of the second user 120 in real-time to the voice assistant device 102. Thus, the processor 302 may determine the proximity and recognize the presence of the second user 120 based on the information from the smart device 106-1. Based on the determination, the processor 302 may activate the non-voice input mode because the second user 120 is present in vicinity of the first user 104. The processor 302 may activate the camera 316 to obtain a follow-up command which may be non-voice input and consisted of lip-movements or the first user's face or body gestures.

Referring to FIG. 7C, the voice assistant device 102 may prompt the first user 104 to provide the follow-up command in a privacy mode or a non-voice input mode and generate output O-3 of "provide a list of personal items in the privacy mode through the camera 316". The output O-3 may be displayed on a display 308 or the output O-3 may be a predetermined signal such as blinking an LED mounted on the voice assistant device 102 with a predetermined color. The first user 104 may notice the O-3 output as a request of providing non-voice inputs in the privacy mode by the voice assistant device 102. The privacy mode may be indicative of providing a list of personal items by moving lips without any audio, i.e., in the lip-reading mode. The camera 316 may then capture the video 704 of lip movements of the first user 104. The processor 302 may then analyze the video 704 to recognize the items of P1, P2, and P3, and complete the operation of adding items into a purchase list in the E-commerce Application. The processor 302 may generate output O-4 to confirm the completion of the operation to the user 104 as "items added".

FIGS. 8A, 8B, 8C and 8D illustrate example scenarios of managing voice inputs and non-voice inputs with a voice assistant device, according to an embodiment of the disclosure.

Figure 8A:
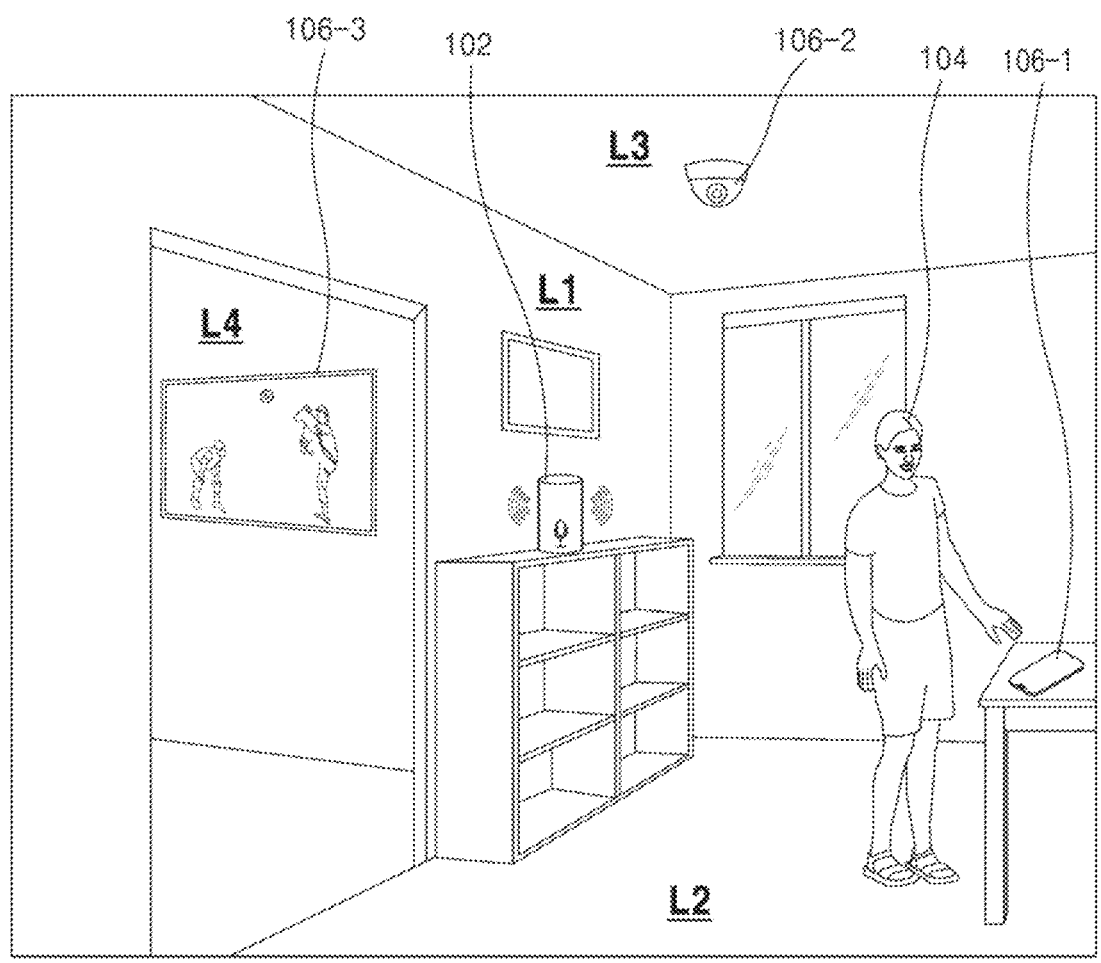
FIGS. 8A, 8B, 8C and 8D illustrate example scenarios of managing voice inputs and non-voice inputs with a voice assistant device, according to an embodiment of the disclosure.

Referring to FIG. 8A, the voice assistant device 102 is a voice-controlled intelligent assistant device with a speaker and is located at location L1. The voice assistant device 102 is connected to three devices, i.e., a smart device 106-1 at location L2, a smart device 106-2 at location L3, and a smart device 106-3 at location L4. The smart device 106-1 may be a smartphone having the camera 316 and the smart device 106-2 is a smart camera. The smart device 106-1 is in proximity to the user 104. Locations L1, L2, and L3 may be in the same (designated) area and location L3 may be in a different (designated) area. In the example, when the area is a living room, L1 is at one corner of the room, L2 is at another corner of the room, and L3 is on the ceiling. As such, the voice assistant device 102 may be located in one corner L1 while the first user 104 along with the smartphone 106-1 may be in another corner L2. The smart camera 106-2 may be mounted on the ceiling. The other area is another room and L4 may be at a wall of another room. The smart device 106-3 is a smart TV with a camera and may be mounted on the wall. The smart TV 106-3 and the smart device 106-1 may be in an idle mode.

Figure 8B:
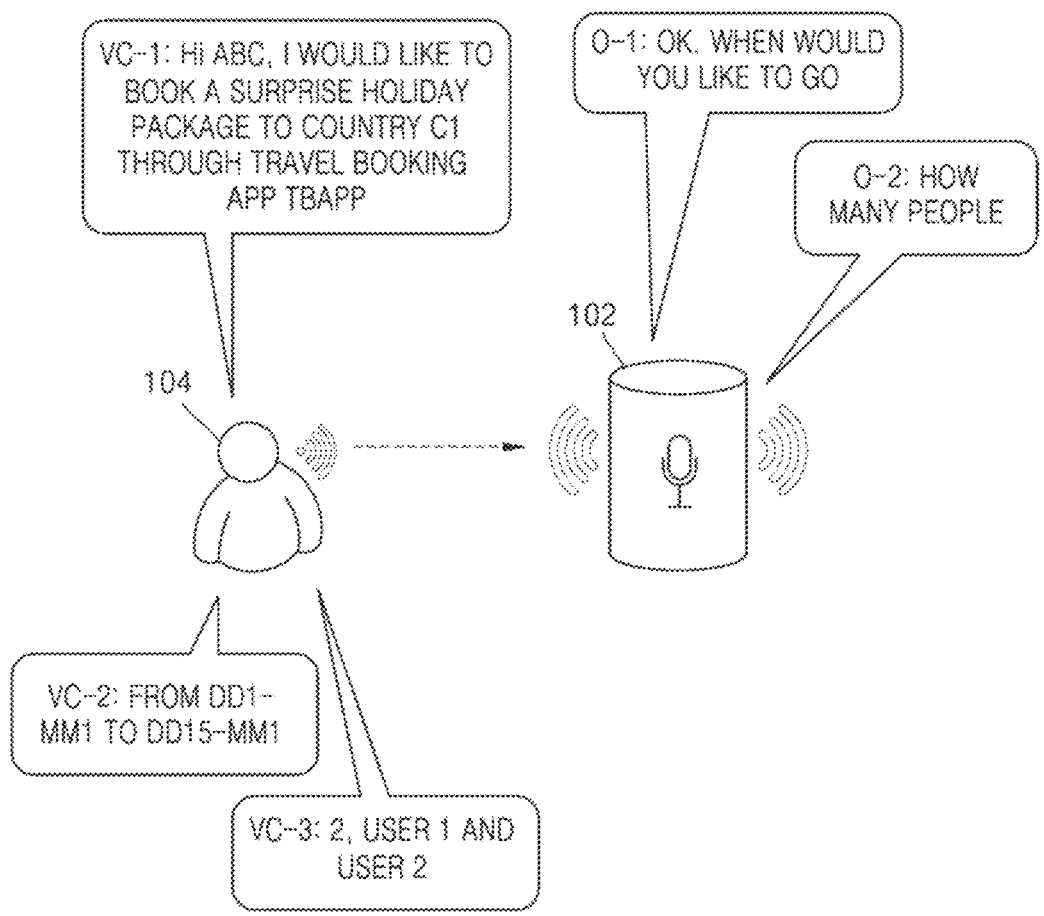

Referring to FIG. 8B, the camera 316 is deactivated in the voice input mode of the voice assistant device 102. The first user 104 may engage in a dialogue-based conversation with the voice assistant device 102 to perform a certain operation, i.e., creating a travel plan and making bookings. Accordingly, the first user 104 may provide a voice command VC-1 to initiate the operation by inputting "Hi ABC, I would like to book a surprise holiday package to country C1 through travel booking app TBAPP". In response to the voice command VC-1, the processor 302 may analyze the content of VC-1 and generate an output O-1 to seek further information from the first user 104 by responding "Ok. When would you like to go?" In response, the first user 104 may provide another voice command VC-2 of "From DD1-MM1 to DD15-MM1". In response to the voice command VC-2, the processor 302 may analyze the voice command VC-2 and generate an output O-2 to seek further information from the first user 104 by responding "how many people". In response, the first user 104 may provide another voice command VC-3 of "2, User 1 and User 2". The processor 302 may extract a context of "surprise" and "user 2" and may extract the user intent of "making user 2 surprised" based on the predefined keywords "surprise", "holiday", "user 2" which may match predetermined keywords stored in the memory 304. The processor 302 may determine the probability of exchanging private data and/or that the follow-up command may include private content, i.e., booking travel-related items such as an airplane, a hotel, a special restaurant secretly, based on the context.

Figure 8C:
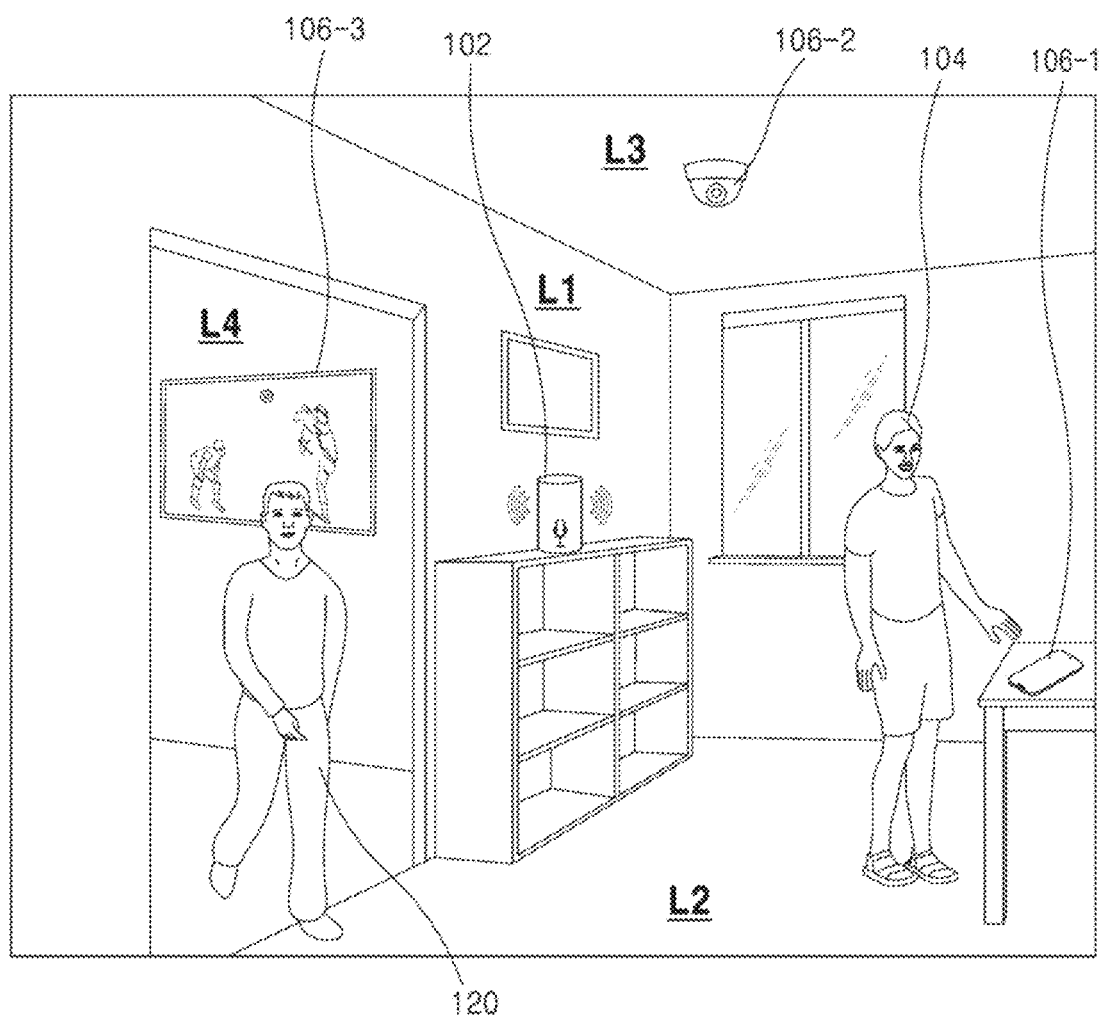

Referring to FIG. 8C, the processor 302 may detect that a second user 120, who is the user 2 in the voice command VC-3, is present in proximity to the voice assistant device 102 from the signals provided by the smart camera 106-2 or the user 2's voice input to the voice assistant device 102. The voice assistant device 102 may recognize the user 2 based on matching between pre-stored user 2's voice and the current voice input of the user 2. Based on the detection, the processor 302 may activate the non-voice input mode. The processor 302 may determine that the smartphone 106-1 is placed close to the first user 104 than the smart TV 106-3 and therefore camera of the smartphone 106-1 is ready to receive a follow-up command which will be not recognized by the user 2. The processor 302 may then control and/or activate the camera of the smartphone 106-1 to receive the follow-up command.

Figure 8D:
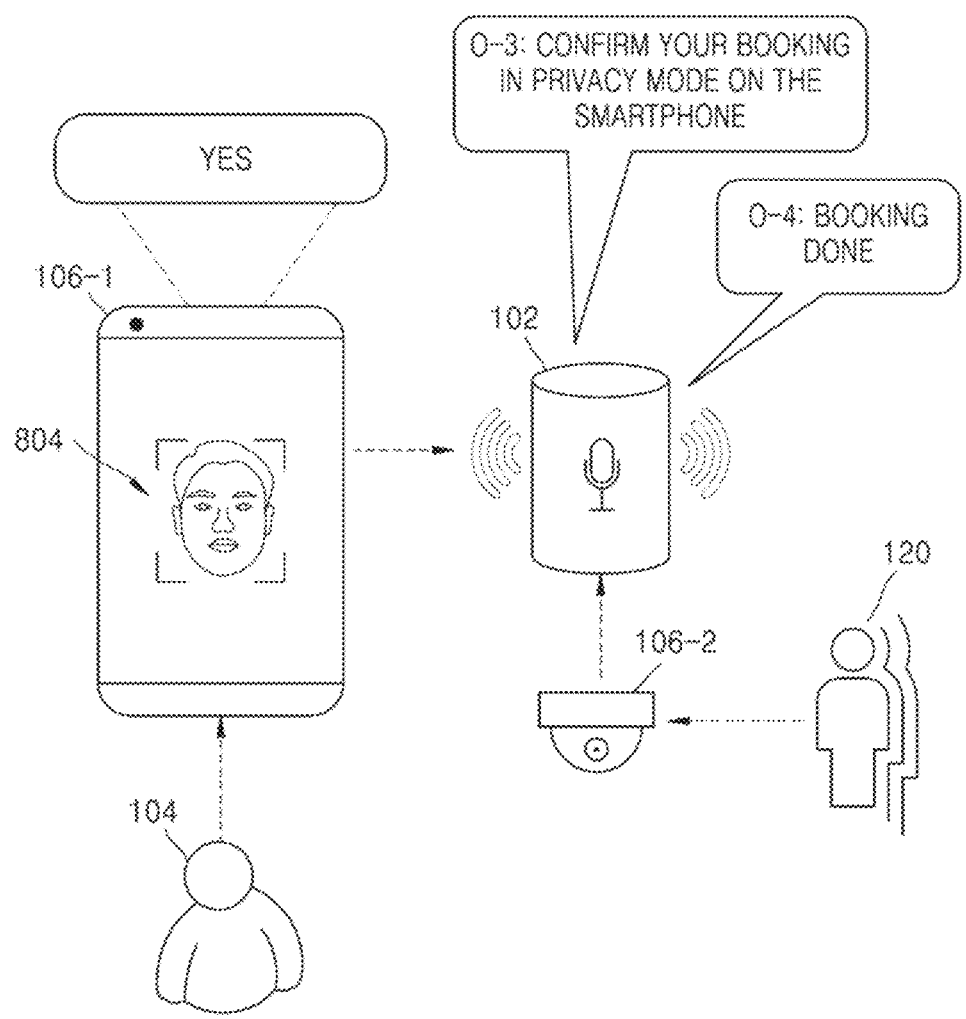

Referring to FIG. 8D, the processor 302 may prompt the first user 104 to provide the follow-up command in the privacy mode or in the non-voice input mode and generate output O-3 of "confirm your booking in privacy mode on the smartphone". The privacy mode may support providing confirmation by moving lips without any audio, i.e., in a lip-reading mode. The camera of the smart device 106-1 may then capture the video 804 of lip movements of the first user 104. The video 804 of the lip movements of the first user 104 may be transmitted to the voice assistant device 102. The processor 302 may then analyze the video 804 to determine the confirmation from the statement of "yes" and complete the operation. The system 116 may generate output O-4 of "booking done" to confirm the completion of the operation to the first user 104. Alternatively, the processor of the smart device 106-1 may analyze the video 804 and transmit the confirmation of "yes" from the first user 104 to the voice assistant device 102.

FIGS. 9A, 9B, 9C and 9D illustrate example scenarios of managing voice inputs and non-voice inputs with a voice assistant device, according to an embodiment of the disclosure.

Figure 9A:
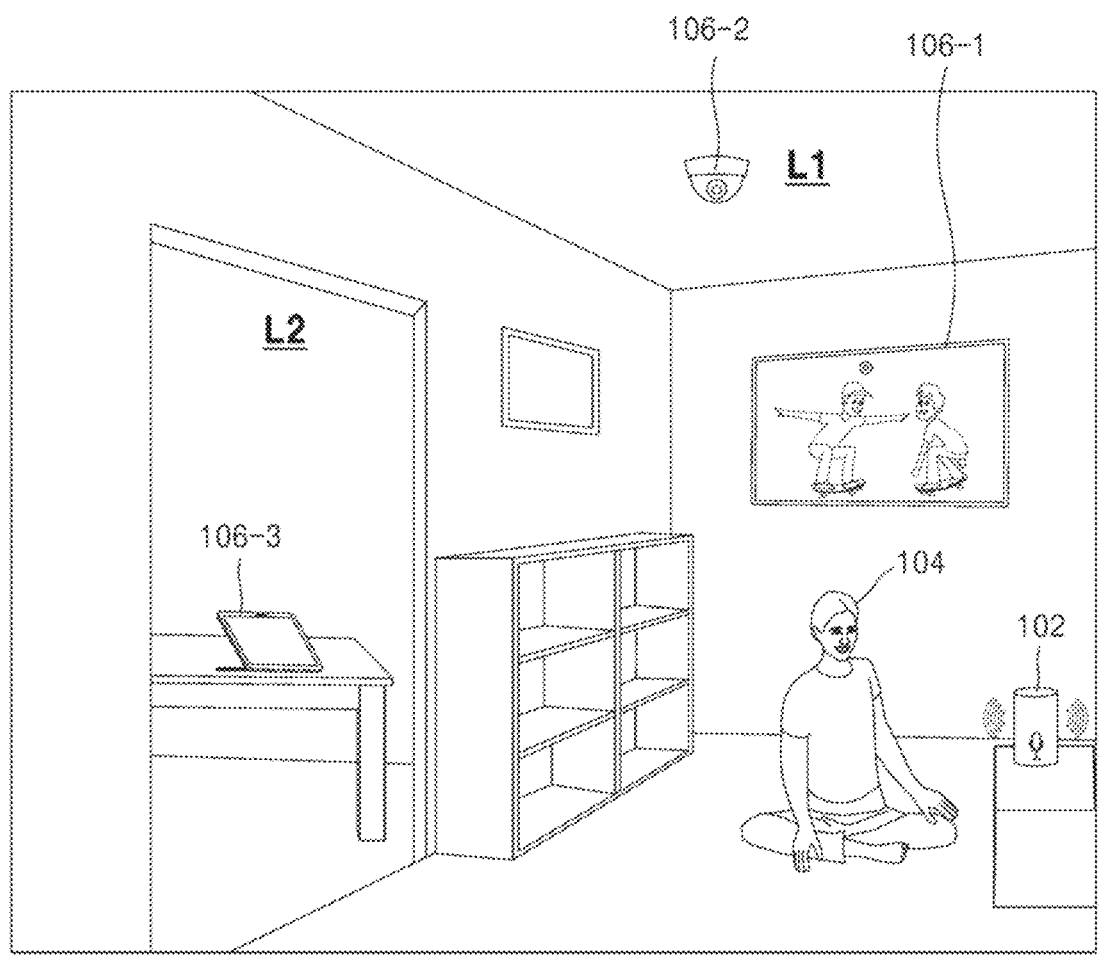
FIGS. 9A, 9B, 9C and 9D illustrate example scenarios of managing voice inputs and non-voice inputs with a voice assistant device, according to an embodiment of the disclosure.

In an embodiment, the voice assistant device 102 is a voice-controlled intelligent assistant device with a speaker. Referring to FIG. 9A, the voice assistant device 102 is connected to two devices-a smart device 106-1 and a smart device 106-2 at location L1 and a smart device 106-3 at location L2. The smart device 106-1 is a smart TV with a camera and the smart device 106-2 is a smart camera. The smart device 106-1 and the smart device 106-2 are in proximity to the first user 104 who is in L1. The smart device 106-3 is a smartphone having a camera. The location L1 and location L2 are different locations. In an example, the location L1 is a living room and the location L2 is a study room. As such, the smart TV may be mounted on one wall of the living room, the smart camera may be mounted on a ceiling of the living room, and the voice assistant device 102 is located in one corner of the living room. The smart device 106-1, i.e., the smart TV is in an active mode, i.e., playing media content while the smart device 106-3, i.e., the smartphone is in an idle mode, for example, in a charging mode.

Figure 9B:
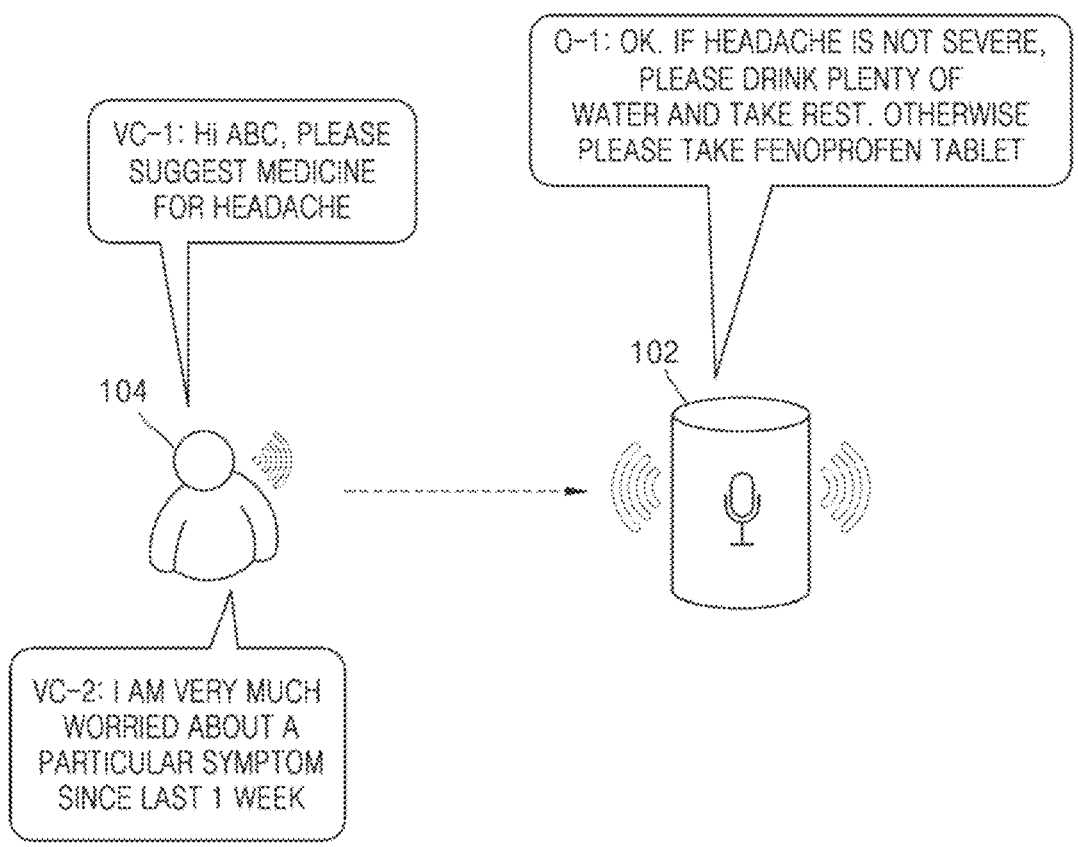

Referring to FIG. 9B, the camera of the smart device 106-3 and the camera of the smart TV 106-1 are deactivated while the voice input mode is activated on the voice assistant device 102. The smart device 106-1 is playing media content. The first user 104 may engage in a dialogue-based conversation with the voice assistant device 102 to perform a certain operation of seeking a response to health-related queries. Accordingly, the first user 104 may provide a voice command VC-1 to initiate the operation by inputting "Hi ABC, please suggest medicine for headache". In response to the voice command VC-1, the processor 302 may analyze the voice command and generate an output O-1 to provide a response to the first user 104 with "If headache is not severe, please drink plenty of water and take rest. Otherwise please take Fenoprofen tablet." In response, the first user 104 may provide another voice command VC-2 indicating some other symptoms of "I am very much worried about a particular symptom since last 1 week". The processor 302 may derive or extract the context of "private health-related queries" and the user intent of "to tell symptoms in privacy" based on the voice commands. The processor 302 may detect the probability of exchanging private data or that the follow-up command may include confidential and private data, i.e., symptoms related health based on the context and the user intent.

Figure 9C:
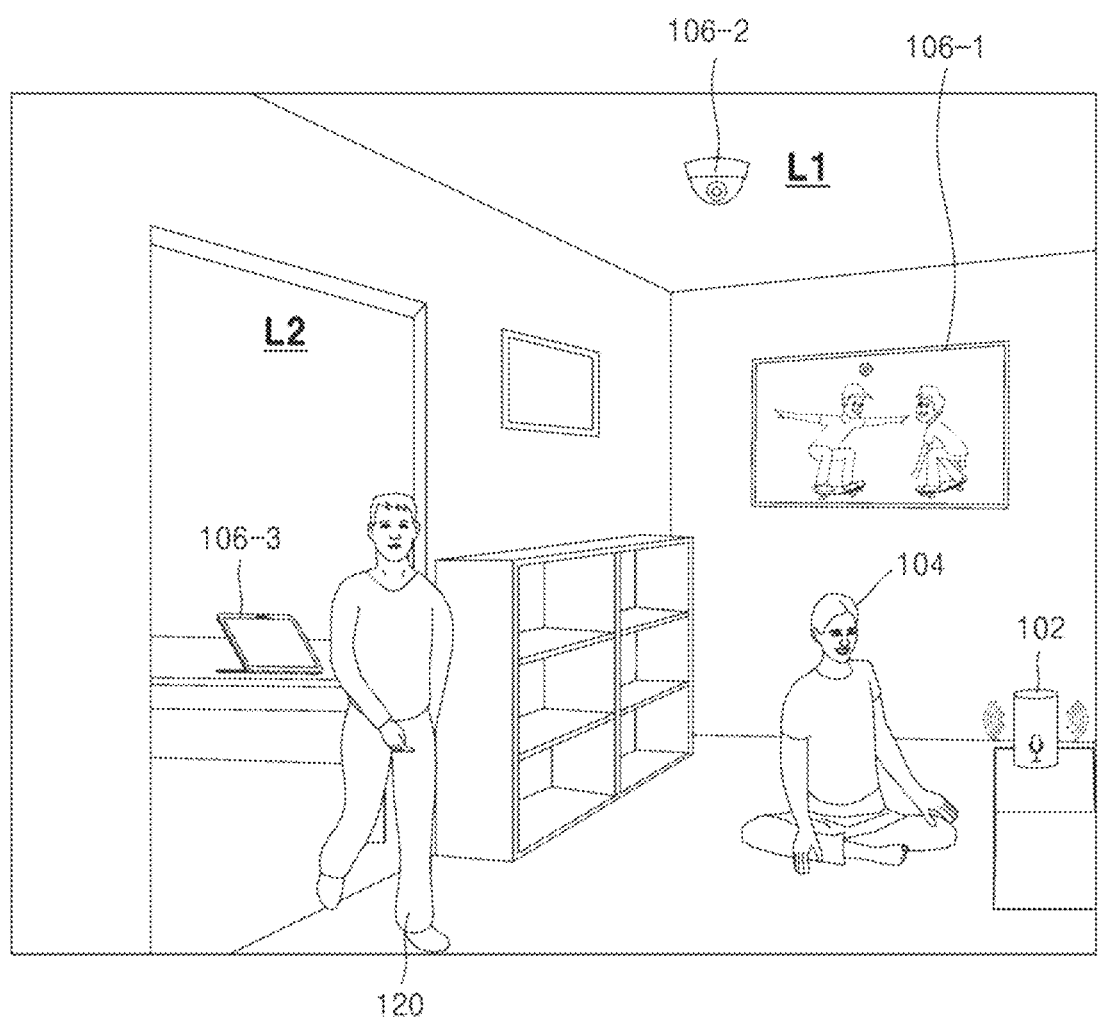

Referring to FIG. 9C, the processor 302 may detect a presence of a second user 120 in proximity to the first user 104 from the signals provided by the smart camera 106-2. Based on the detection, the processor 302 may activate the non-voice input mode. The processor 302 may determine that the smart TV 106-1 including a camera is proximate to the first user 104 but is playing media while the smartphone 106-3 is in an idle mode, and therefore the camera of the smartphone 106-3 is capable of receiving a follow-up command. The processor 302 may then control or activate the camera of the smartphone 106-3 to receive the follow-up command-non-voice inputs.

Figure 9D:
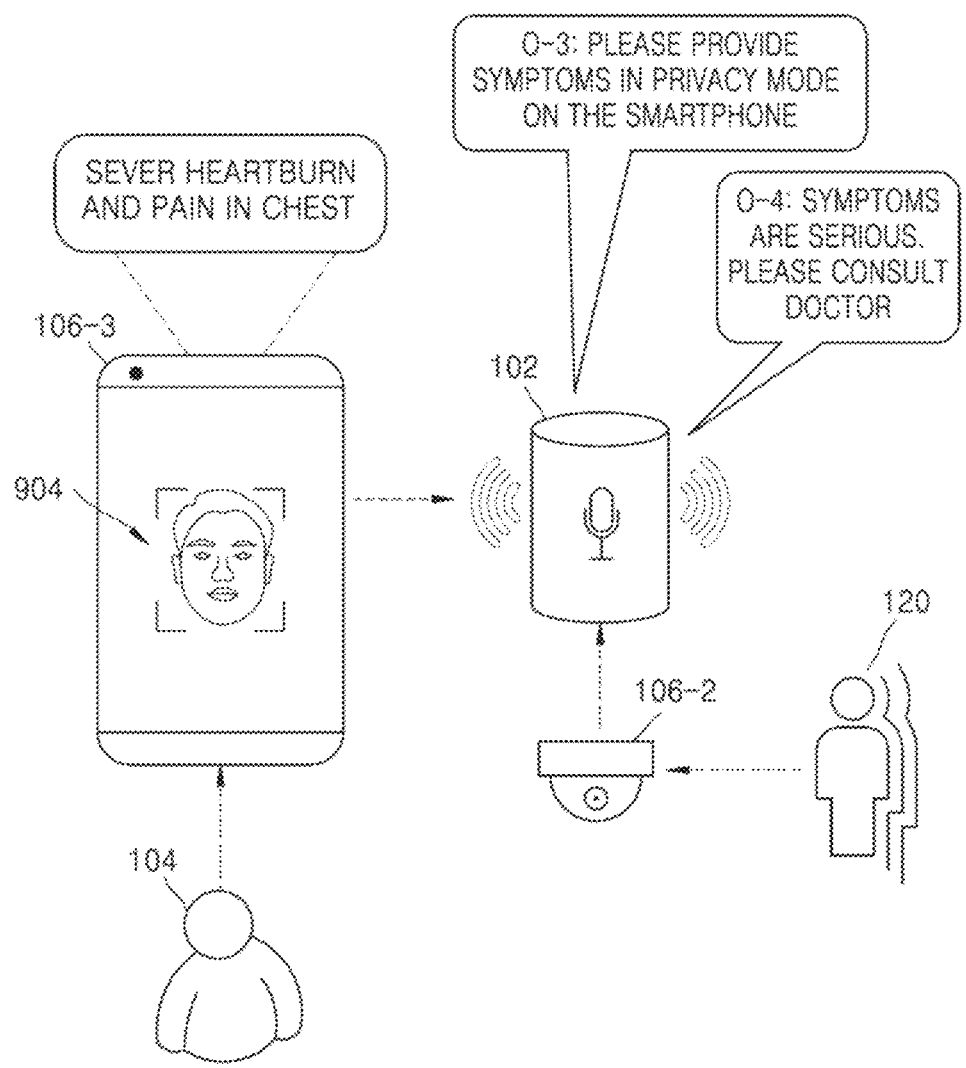

Referring to FIG. 9D, the processor 302 may prompt the first user 104 to provide the follow-up command in a privacy mode or a non-voice input mode and generate an output O-3 of "please provide the symptoms in privacy mode on the smartphone". The privacy mode may support providing confirmation by moving lips without any audio, i.e., in a lip-reading mode. The camera of the smart device 106-3 may then capture the video 904 of lip movements of the first user 104. The processor 302 may then analyze the video 904 to determine symptoms as severe heartburn, chest pain, and complete the operation. The processor 302 may generate an output O-3 of "symptoms are serious, please consult doctor" to confirm the completion of the operation to the first user 104.

Figure 10:
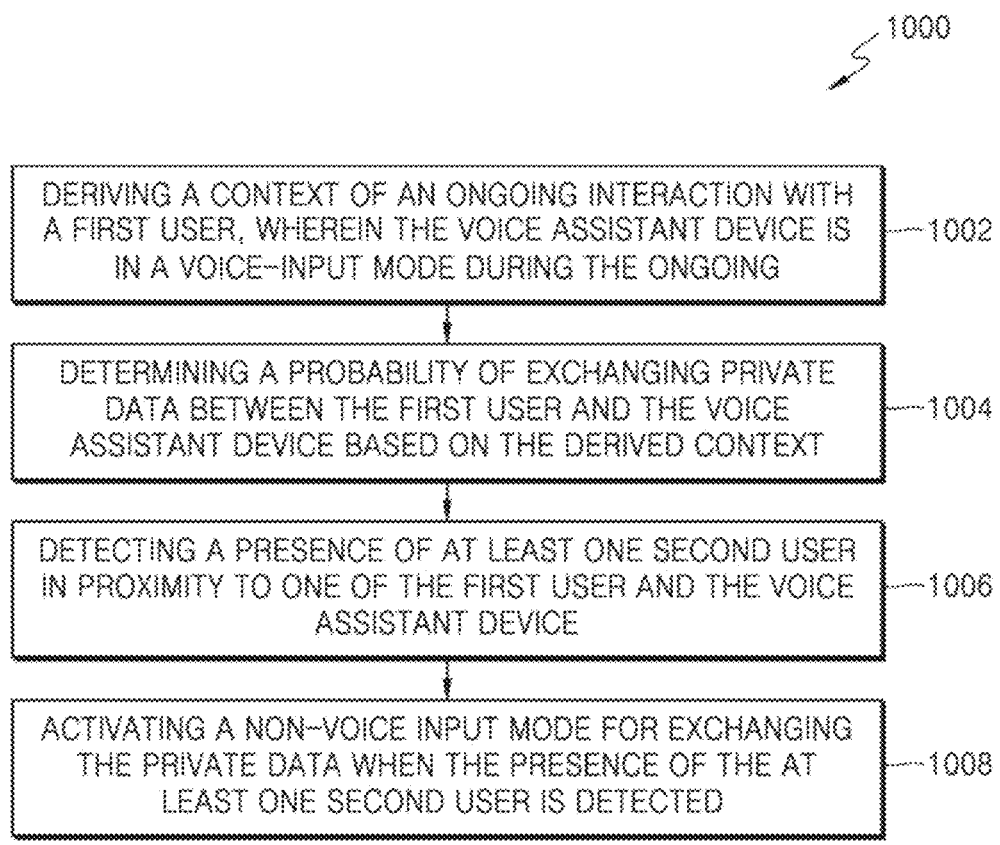
FIG. 10 illustrates a flow diagram of managing voice inputs and non-voice inputs with a voice assistant device, according to an embodiment of the disclosure.

FIG. 10 illustrates a flow diagram of managing voice inputs and non-voice inputs with a voice assistant device, according to an embodiment of the disclosure.

FIG. 10 illustrates a flow diagram of managing voice inputs and non-voice inputs with a voice assistant device, according to an embodiment of the disclosure.

The method 1000 may be implemented by the voice assistant device 102 or the smart device 106. Further, for the sake of brevity, details of the present disclosure that are explained in detail in the description of FIG. 1 to FIG. 9D are not explained in detail in the description of FIG. 10.

In operation 1002, a context of an ongoing interaction with a first user is derived or extracted when a voice input mode is activated on the voice assistant device 1002 during the ongoing interaction.

In operation 1004, the probability of exchanging private data between the first user and the voice assistant device 102 is determined based on the derived context.

In operation 1006, a presence of at least one second user in proximity to one of the first user and/or the voice assistant device 102 is detected.

In operation 1008, a non-voice input mode is activated to exchange the private data when the presence of the at least one second user is detected.

Further, in accordance with some embodiments, the method 1000 may include an additional operation for activating the non-voice input mode. The method 1000 includes obtaining a first plurality of parameters pertaining to the voice assistant device and a second plurality of parameters pertaining to at least one smart device connected with the voice assistant device. The method 1000 includes determining at least one of the voice assistant device 102 and the at least one smart device 106 is capable of receiving an input in non-voice input mode based on the first plurality of parameters, the second plurality of parameters, and/or the presence of the at least one second user. The method 1000 includes based on the determination, enabling at least one of the voice assistant device 102 and the at least one smart device 106 to exchanging the private data. The method 1000 includes notifying the first user to provide the private data via at least one of the voice assistant device and the at least one smart device connected.

Further, the method 1000 may include additional operations. The method 1000 includes receiving at least one follow-up command from the first user when the non-voice input mode is activated on the voice assistant device via at least one of the voice assistant device and the at least one smart device during the current interaction. The method 1000 includes determining the private data from the at least one follow-up command. The method 1000 includes notifying the first user when the operation is completed based on the private data. The method 1000 includes preventing reproduction of the private data by the voice assistant device upon at least one of receiving the at least one follow-up command and the completion of the operation.

FIG. 11 illustrates a flow diagram of managing voice inputs and non-voice inputs with a voice assistant device, according to an embodiment of the disclosure.

In operation 1102, the voice assistant device 102 may detect a privacy triggering event while obtaining at least one voice input from a user. The privacy triggering event may include a presence of a second user while communication with the user.

In operation 1104, the voice assistant device 102 may switch to a non-voice input mode from a voice input mode in response to the privacy triggering event.

In operation 1106, the voice assistant device 102 may obtain non-voice input from the user in the non-voice input mode. The non-voice input mode may include at least one of a lip-reading mode, a text mode, or a gesture mode, and the non-voice input may include at least one of a lip-shape of the user in the lip-reading mode, a text input of the user in the text mode, or a gesture input of the user in the gesture mode.

In operation 1108, the voice assistant device 102 may execute an action corresponding to the non-voice input.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor 106 may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMS, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of managing private data in a voice assistant device, the method comprising:
    detecting a privacy triggering event while obtaining at least one voice input from a first user, based on a dialog-based verbal conversation input from the first user
    obtaining a first plurality of parameters associated with the voice assistant device and a second plurality of parameters associated with an electronic device communicatively connected to the voice assistant device,
    wherein the first plurality of parameters comprise at least one of a location of the voice assistant device, an indication of whether a non-voice input mode is supported by the voice assistant device, a distance between the voice assistant device and the first user, and a distance between the voice assistant device or a second user, and
    wherein the second plurality of parameters comprise at least one of a location of the electronic device, an operational status of the electronic device, a current activity of the electronic device, a distance between the electronic device and the first user, and a distance between the electronic device or the second user;
    determining that between the voice assistant device and the electronic device, only the electronic device is capable of receiving at least one non-voice input based on the first plurality of parameters and the second plurality of parameters; and
    notifying the first user to communicate private data corresponding to the at least one non-voice input with the electronic device instead of the voice assistant device.

2. The method of claim 1, wherein the non-voice input mode comprises at least one of a lip-reading mode, a text mode, or a gesture mode, and
    wherein the at least one non-voice input comprises at least one of lip movements of the first user, a text input of the first user, or a gesture input of the first user.

3. The method of claim 2, wherein the non-voice input mode corresponds to the lip-reading mode, and the at least one non-voice input corresponds to the lip movements of the first user, and
    wherein the at least one non-voice input is obtained by:
    activating a camera to read the lip movements of the first user in the lip-reading mode.

4. The method of claim 1, wherein the detecting of the privacy triggering event comprises:
    detecting a presence of the second user based on at least one of ambient noise, a voice input of the second user, or an input from the electronic device communicatively coupled with the voice assistant device.

5. A voice assistant device for managing private data, the voice assistant device comprising:
    at least one memory configured to store one or more instructions; and
    at least one processor configured to execute the one or more instructions to:

detect a privacy triggering event while obtaining at least one voice input from a first user, based on a dialog-based verbal conversation input from the first user, obtain a first plurality of parameters associated with the voice assistant device and a second plurality of parameters associated with an electronic device communicatively connected to the voice assistant device, wherein the first plurality of parameters comprise at least one of a location of the voice assistant device, an indication of whether a non-voice input mode is supported by the voice assistant device, a distance between the voice assistant device and the first user, or a distance between the voice assistant device and a second user, and wherein the second plurality of parameters comprise at least one of a location of the electronic device, an operational status of the electronic device, a current activity of the electronic device, a distance between the electronic device and the first user, or a distance between the electronic device and the second user;

determine that between the voice assistant device and the electronic device, only the electronic device is capable of receiving at least one non-voice input based on the first plurality of parameters and the second plurality of parameters; and notify the first user to communicate the private data corresponding to the at least one non-voice input with the electronic device instead of the voice assistant device.

6. The voice assistant device of claim 5, wherein the non-voice input mode comprises at least one of a lip-reading mode, a text mode, or a gesture mode, and wherein the non-voice input comprises at least one of lip movements of the first user, a text input of the first user, or a gesture input of the first user.

7. The voice assistant device of claim 6, wherein the non-voice input mode corresponds to the lip-reading mode, and the non-voice input corresponds to the lip movements of the first user, wherein the voice assistant device further comprises or is connected to a camera, and wherein the at least one processor is further configured to execute the one or more instructions to: activate the camera to read the lip movements of the first user in the lip-reading mode.

8. The voice assistant device of claim 5, wherein the at least one processor is further configured to execute the one or more instructions to:

detect a presence of the second user based on at least one of ambient noise, a voice input of the second user, or an input from the electronic device communicatively coupled with the voice assistant device.

* * * * *